United States Patent
Santhanam et al.

(10) Patent No.: US 9,668,166 B2
(45) Date of Patent: May 30, 2017

(54) QUALITY OF SERVICE FOR WEB CLIENT BASED SESSIONS

(71) Applicant: QUALCOMM Incorporated, San Diego, CA (US)

(72) Inventors: Arvind Vardarajan Santhanam, San Diego, CA (US); Kirankumar Anchan, San Diego, CA (US); Karthika Paladugu, San Diego, CA (US); Mark Maggenti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/163,938

(22) Filed: Jan. 24, 2014

(65) Prior Publication Data

US 2014/0219167 A1  Aug. 7, 2014

Related U.S. Application Data

(60) Provisional application No. 61/760,789, filed on Feb. 5, 2013.

(51) Int. Cl.
*H04W 28/02* (2009.01)
*H04L 29/08* (2006.01)
(Continued)

(52) U.S. Cl.
CPC ..... *H04W 28/0268* (2013.01); *H04L 47/2416* (2013.01); *H04L 65/1069* (2013.01);
(Continued)

(58) Field of Classification Search
None
See application file for complete search history.

(56) References Cited

U.S. PATENT DOCUMENTS

| 6,847,610 B1 * | 1/2005 | Suumaki | H04L 12/5695 370/230.1 |
| 7,079,526 B1 * | 7/2006 | Wipliez | H04L 12/4608 370/252 |

(Continued)

FOREIGN PATENT DOCUMENTS

CN  102595472 A  7/2012

OTHER PUBLICATIONS

3GPP Draft: "3GPP IMS Webrtc Wid Oerview R1", 3rd Generation Partnership Project (3GPP), Mobile Competence Centre. 650, Route Des Lucioles. F-06921 Sophia-Antipolis Cedex, France Nov. 19, 2012 (Nov. 19, 2012), XP050681650. Retrieved from the Internet: URL:http://www.3gpp.org/ftp/tsg_sa/WG1_Serv/TSGS1 60 Edinburgh/docs/ [retrieved on Nov. 19, 2012], pp. 3-8.

(Continued)

*Primary Examiner* — Hassan Kizou
*Assistant Examiner* — Hashim Bhatti
(74) *Attorney, Agent, or Firm* — MG-IP Law, P.C.

(57) ABSTRACT

The disclosure generally relates to network-initiated and client-initiated mechanisms to enable quality of service (QoS) for web-based client applications that may high efficiency, high performance, or otherwise guaranteed service levels. For example, to enable QoS for calls or other sessions associated a web-based application, one or more signaling messages may be exchanged between a server and a first user equipment (UE) to establish a call between the first UE and a second UE and to establish a peer connection between the server and at least the first UE. As such, QoS may be activated for at least the peer connection between the first UE and the server, wherein the server may route data associated with the web-based application between the first UE and the second UE over the established peer connection to implement the activated QoS.

37 Claims, 17 Drawing Sheets

(51) Int. Cl.
  *H04L 12/853* (2013.01)
  *H04L 29/06* (2006.01)
  *H04L 12/857* (2013.01)

(52) U.S. Cl.
  CPC ............. *H04L 65/80* (2013.01); *H04L 67/02* (2013.01); *H04L 67/322* (2013.01); *H04W 28/0231* (2013.01); *H04L 47/2491* (2013.01)

(56) References Cited

U.S. PATENT DOCUMENTS

| | | | | |
|---|---|---|---|---|
| 7,769,875 | B1* | 8/2010 | Moisand | H04L 67/2804 709/223 |
| 8,498,208 | B2* | 7/2013 | Wang | H04W 76/02 370/235 |
| 8,675,659 | B2* | 3/2014 | McNamee | H04L 67/2819 370/351 |
| 9,210,266 | B2* | 12/2015 | Lum | H04M 3/5133 |
| 2004/0100903 | A1* | 5/2004 | Han | H04L 12/5695 370/230 |
| 2004/0131078 | A1* | 7/2004 | Gupta | H04L 12/5692 370/466 |
| 2004/0142697 | A1* | 7/2004 | Knaebchen | H04L 12/5695 455/452.1 |
| 2007/0153801 | A1* | 7/2007 | Sung | H04L 12/2602 370/395.4 |
| 2009/0135842 | A1* | 5/2009 | Zhu | H04L 12/66 370/401 |
| 2009/0190471 | A1* | 7/2009 | Mahendran | H04L 12/5695 370/230.1 |
| 2009/0207866 | A1* | 8/2009 | Cholas | H04L 12/2801 370/505 |
| 2009/0264096 | A1* | 10/2009 | Cai | H04L 12/1403 455/406 |
| 2011/0211439 | A1* | 9/2011 | Manpuria | H04W 72/005 370/216 |
| 2011/0251902 | A1* | 10/2011 | Nagarajayya | G06Q 30/02 705/14.71 |
| 2011/0252154 | A1* | 10/2011 | Bunch | H04M 3/4217 709/230 |
| 2011/0261695 | A1* | 10/2011 | Zhao | H04W 28/10 370/232 |
| 2012/0150942 | A1* | 6/2012 | Alev | G06Q 10/101 709/203 |
| 2012/0195196 | A1* | 8/2012 | Ghai | H04W 28/24 370/235 |
| 2013/0231080 | A1* | 9/2013 | Cheuk | H04W 15/765 455/405 |
| 2014/0126714 | A1* | 5/2014 | Sayko | H04M 3/5191 379/265.09 |

OTHER PUBLICATIONS

International Search Report and Written Opinion—PCT/US2014/013644—ISA/EPO—May 2, 2014.
Taiwan Search Report—TW103103828—TIPO—Jun. 18, 2015.

* cited by examiner

QUALITY OF SERVICE FOR WEB CLIENT BASED SESSIONS

PRIORITY CLAIM UNDER 35 U.S.C. §119

The present application for patent claims the benefit of U.S. Provisional Patent Application Ser. No. 61/760,789, entitled "QUALITY OF SERVICE FOR WEB CLIENT BASED SESSIONS," filed Feb. 5, 2013, assigned to the assignee hereof, which is expressly incorporated herein by reference in its entirety.

TECHNICAL FIELD

Various embodiments described herein relate to enabling quality of service (QoS) capabilities for a web client using certain wireless network technologies that otherwise lack the ability to support QoS in cellular networks.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA). In these and other contexts, sessions that operate over networks such as 1× EV-DO, UMTS-based W-CDMA, LTE, and eHRPD can be supported on channels (e.g. radio access bearers, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or set up) for channels associated with real-time or streaming communication sessions, such as Voice-over IP (VoIP) sessions, group communication sessions (e.g., Push-to-Talk sessions, etc.), online games, IP TV, and so on, to help ensure seamless end-to-end packet transfer for these sessions. In certain cases, scheduled always-on (GBR) service for high-priority applications running on a user equipment (UE) or other suitable mobile device may be desirable to improve capacity (e.g., on the UE and/or the network that provides the always-on service) and further to improve resource network usage. For example, real-time communication often requires always-on service to ensure bi-directional IP communication. However, applications that use HTML, Cascading Style Sheets (CSS), JavaScript (JS), and other web clients currently lack the ability to leverage QoS in cellular networks using certain pervasive technologies, such as the WebRTC solution for VoIP, video telephony, and streaming services, among other things. Consequently, these and other web clients may suffer poor voice, video, and other media quality experiences in wireless networks due to higher loss, unguaranteed bandwidth, high jitter, or other performance degradations that may arise when QoS cannot be provided.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one aspect of the disclosure, QoS capabilities may be enabled for web clients using WebRTC, RTCWeb, and other pervasive web technologies that otherwise lack the ability to leverage QoS on a cellular network (e.g., LTE, UMTS, 1× EV-DO, Wi-Fi, etc.) in order to support high efficiency and high performance for VoIP, video, media, and other data services that use certain web technologies otherwise lacking the ability to leverage QoS on cellular networks. As such, QoS-enabled web clients may receive guaranteed performance in a wireless network regardless of cellular network loading, which may translate to very low latency, low jitter, low data loss, and better user experience for web clients that use applications requiring guaranteed quality levels. For example, as will be described in further detail below, QoS activation for web client calls or sessions supported in a cellular network via WebRTC or other suitable web technologies may be network-initiated (e.g., on LTE, UMTS, eHRPD, or other similar wireless networks), explicitly device-initiated (e.g., on 1× EV-DO, LTE, UMTS, eHRPD, Wi-Fi, or other similar wireless networks), and/or implicitly device-initiated (e.g., on any suitable wireless network or other air interface).

According to one aspect of the disclosure, an exemplary architecture that may enable QoS capabilities for UEs communicating using WebRTC or other suitable web technologies may include a media server situated in a media path between a caller browser and a callee browser to support network-initiated, explicit device-initiated, and/or implicit device-initiated QoS setup. In one embodiment, the caller browser and the callee browser may initially contact a signaling server to setup signaling channels using WebSockets, HTTP, or other suitable web technologies and the signaling server may then assign one or more WebRTC PeerConnections during the call establishment phase. For example, the WebRTC PeerConnections may generally allow two users to communicate directly, from browser-to-browser, via a signaling channel that the signaling server coordinates. Each client (e.g., caller browser and callee browser) may then establish a WebRTC connection with the media server as the peer endpoint.

According to one aspect of the disclosure, to support network-initiated QoS setup, the media server may determine whether to activate QoS for the media paths established with the caller browser and/or callee browser. For example, in one embodiment, the media server may perform network address translation (NAT) discovery to determine an IP address and port associated with the WebRTC connection that the caller browser and/or callee browser established therewith, wherein the NAT discovery may indicate the service or application type associated with the WebRTC connection. As such, if the media server determines that the WebRTC connection relates to a service or application type that requires certain QoS guarantees (e.g., voice, video, or streaming media services), the media server may activate an appropriate QoS level for the WebRTC connections established with the caller browser and/or callee browser to initiate QoS on the corresponding media paths. For example, if the media path between the media server and the caller browser and/or callee browser was created on an LTE network, the media server may provide an appropriate QoS class identifier (QCI) of an Evolved Packet System (EPS) bearer associated with the IP address and port corresponding to one or more of the caller browser and/or callee browser for which the QoS was activated, wherein the QCI may generally define a set of QoS parameters of the associated EPS bearer (e.g., minimum GBR, maximum delay, etc.) to ensure that the corresponding media path receives preferential treatment at all components within the LTE backhaul infrastructure. Similarly, if the media path between the media server and the caller browser and/or callee browser is created on an eHRPD network, the media server may provide the appropriate QoS parameters and the IP address and port corresponding to one or more of the caller browser and/or callee browser for which the QoS was activated to the eHRPD network infrastructure components to ensure that the corresponding media path receives appropriate preferential treatment.

According to one aspect of the disclosure, the media server may therefore generally operate as an application server to support communication services for browsers that can connect to the media server via a core cellular network infrastructure and/or the Internet to leverage QoS for applications that use IP bearer resources with the core network during VoIP sessions, PTT sessions, group communication sessions, social networking services, or other services that require high performance or efficiency. For example, to meet tight end-to-end latency or other QoS requirements associated with signaling and data exchanged in the WebRTC or other web-based session, the media server may communicate with the cellular network infrastructure to activate the QoS for the WebRTC flow via an Rx interface (e.g., a reference point between a Policy and Charging Rules Function and an application function that is used to exchange application-level session information). In one embodiment, the activated QoS may then be used to prioritize signaling and data traffic over other application traffic at the routers in the cellular network infrastructure that lie between an Evolved NodeB (eNodeB) and Serving Gateway (S-GW) and thereby reduce backhaul delays associated with the prioritized signaling and data traffic. Accordingly, the media server may route or otherwise forward the traffic between caller browser and callee browser via the appropriate cellular network infrastructure to utilize the activated QoS associated with the traffic between the caller and callee browsers.

According to one aspect of the disclosure, another exemplary architecture that may enable QoS capabilities for UEs communicating using web technologies may include a server that combines the functionality associated with the signaling server and the media server described above. However, those skilled in the art will appreciate that the server combining the signaling and media server functionality may include separate servers to handle signaling and media paths between caller and callee browsers.

According to one aspect of the disclosure, to support explicit client-initiated QoS setup, a WebRTC component may provide an application programming interface (API) that an application may use to specify certain capabilities to enable QoS. For example, the API may generally enable the application to specify capabilities that may include, among other things, bandwidth and service type (e.g., conversational voice, video stream, streaming data, interactive data, best-effort, etc.). Furthermore, if the application will communicate over an LTE or EV-DO/eHRPD cellular network, the service type specified via the provided API may further include a QCI or QoS profile identifier and an access point name (APN), wherein a UMTS cellular network may map the APN to an appropriate IP address used therein. As such, in one embodiment, the application may use the API to specify whether the requested service requires QoS when initiating a call via WebRTC component and may further specify the QoS type if required. Alternatively, in one embodiment, the application may predetermine the required QoS upon initialization with the WebRTC stack component, which may integrate with various air interface drivers to negotiate the appropriate QoS with the appropriate cellular network infrastructure. Further still, the WebRTC stack component may activate QoS for the appropriate flow at the time that a call is received in addition to or alternatively to the time that a call is initiated (e.g., based on whether the call is associated with voice, video, data streaming, etc.).

According to one aspect of the disclosure, to support implicit client-initiated QoS setup, the same or a substantially similar call establishment and media exchange communication flow may be employed to that described above with respect to the network-initiated QoS setup, except that the media server (or the server combining the signaling and media server functionality) does not initiate the QoS setup procedure. Instead, at the time that a client application originates a call, the application may use the WebRTC stack component to indicate that the call is being established to resident client software (e.g., a high-level operating system component, a kernel, advanced mobile subscriber software, etc.). In one embodiment, as part of the signaling exchange, the client application may determine the IP address, port, protocol or other suitable connection data that the server allocated to support the call may use to subsequently monitor the corresponding IP flow and detect any data activity thereon. Accordingly, in response to detecting data activity on the corresponding IP flow that has certain QoS requirements, the client application may instruct the resident client software to activate QoS on the corresponding IP flow. For example, in one embodiment, the client application may provide all appropriate QoS descriptors for the IP flow and the type of QoS needed to the resident client software, which may then communicate with the cellular network to activate the appropriate QoS for the call.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
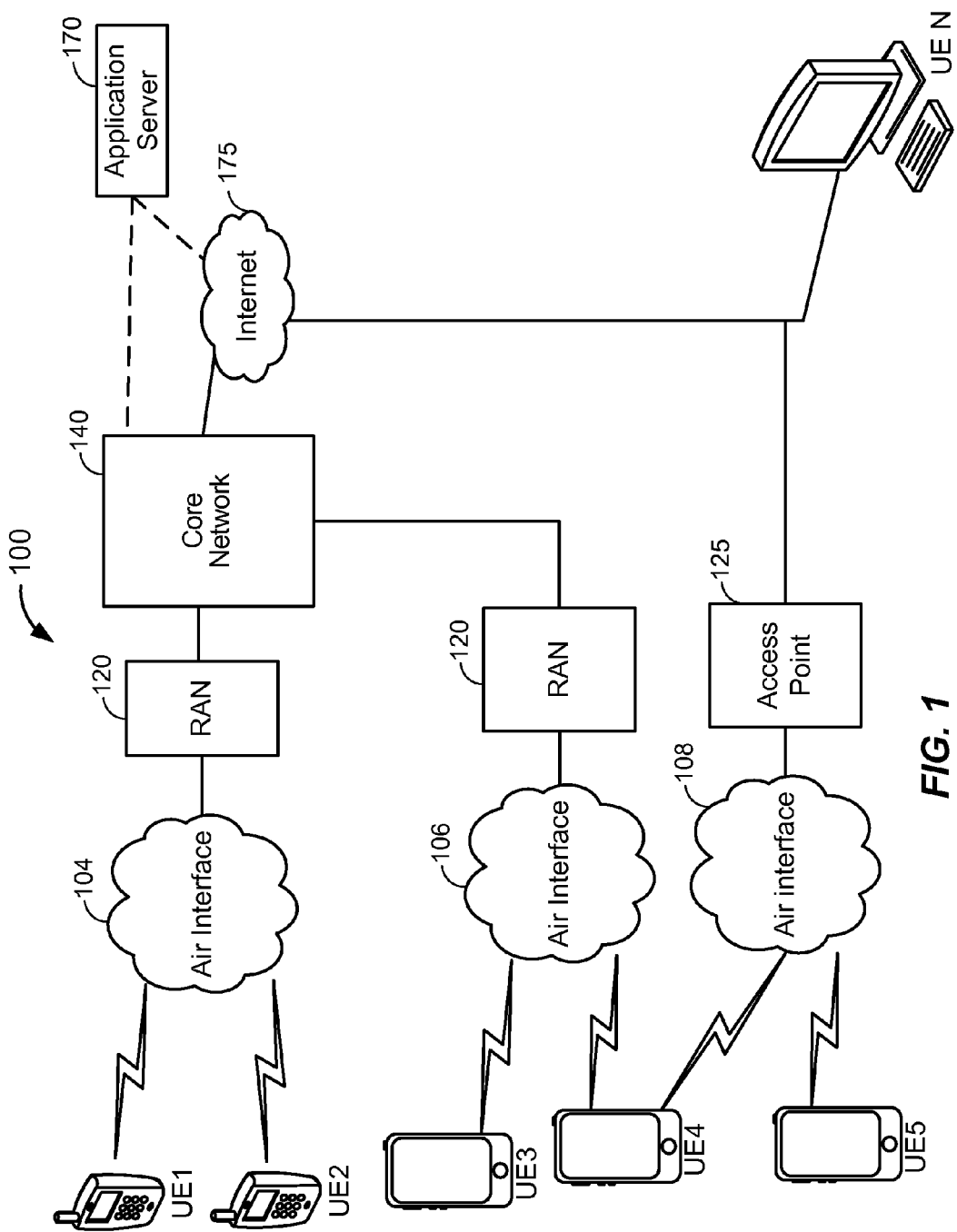
FIG. 1 illustrates a high-level system architecture of a wireless communications system according to one aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 according to one aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, Evolved Node Bs (eNodeBs or eNBs), and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., a Wi-Fi router with wired and/or wireless connectivity may correspond to the access point 125).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
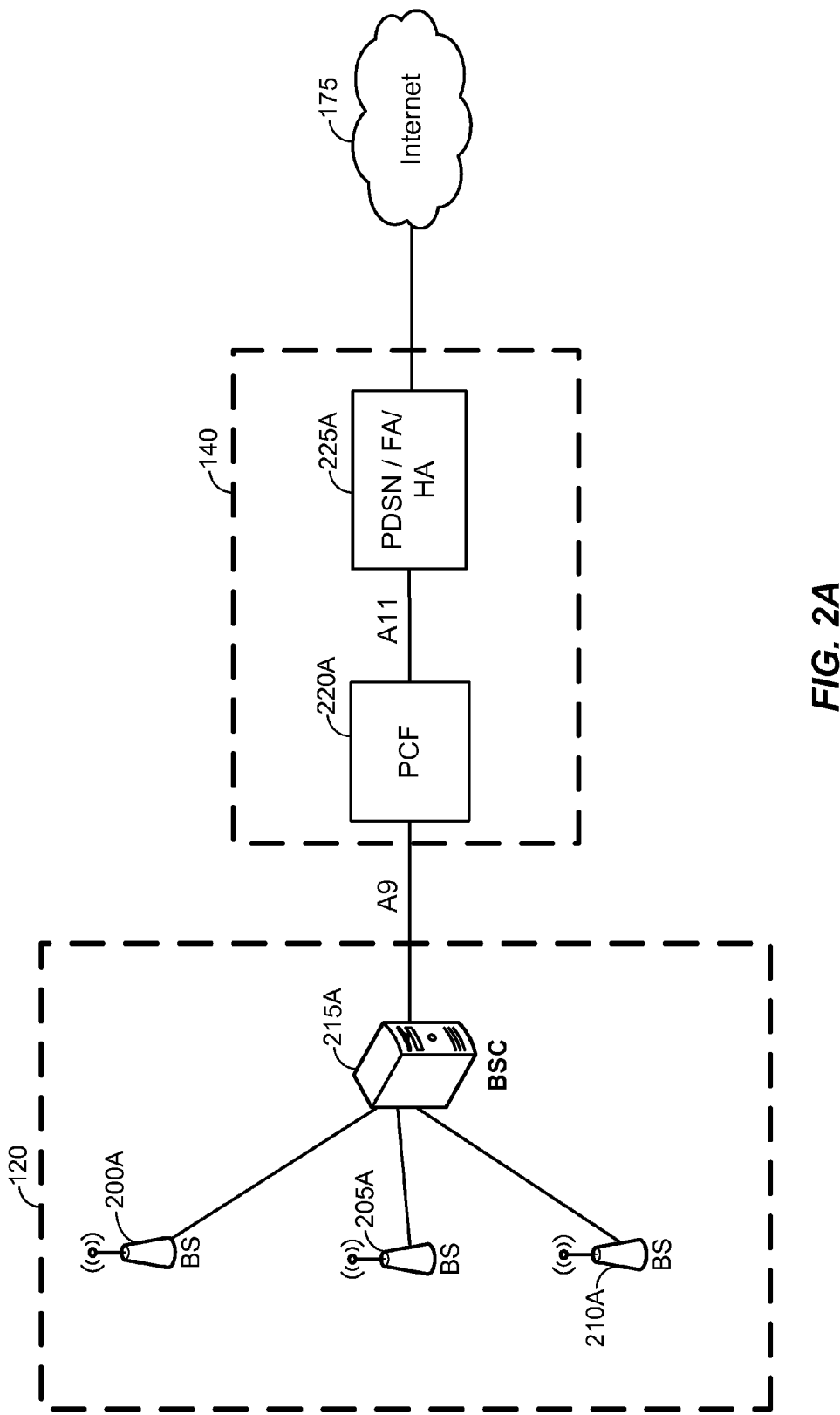
FIG. 2A illustrates an example configuration of a radio access network (RAN) and a packet-switched portion of a core network for a 1× EV-DO network according to one aspect of the disclosure.

FIG. 2A illustrates an example configuration of the RAN 120 and the core network 140 for packet-switched communications in a CDMA2000 1× Evolution-Data Optimized (EV-DO) network according to one aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
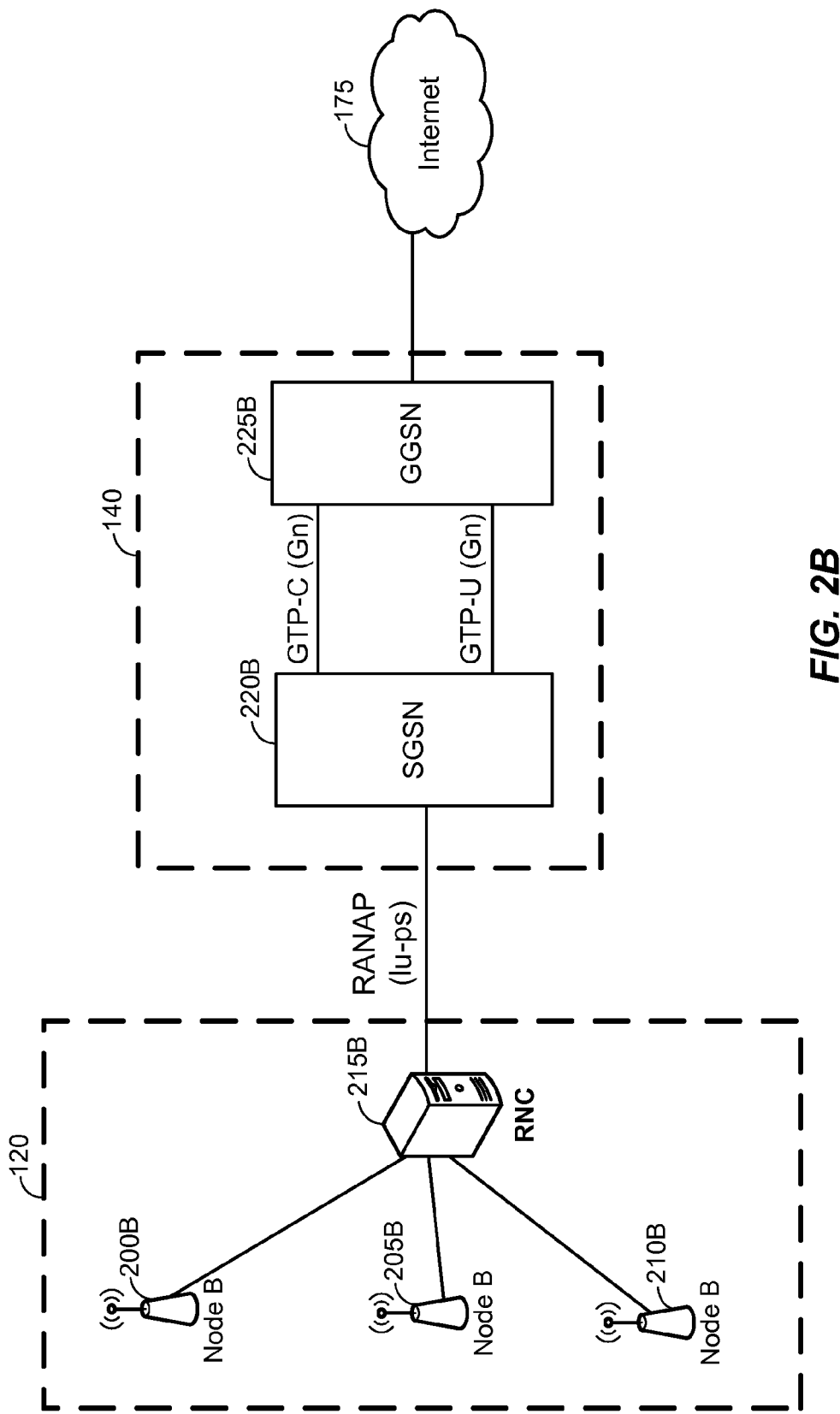
FIG. 2B illustrates an example configuration of the RAN and a packet-switched portion of a General Packet Radio Service (GPRS) core network within a 3G UMTS W-CDMA system according to one aspect of the disclosure.

FIG. 2B illustrates an example configuration of the RAN 120 and a packet-switched portion of the core network 140 that is configured as a GPRS core network within a 3G UMTS W-CDMA system according to one aspect of the disclosure. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management, and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over an Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
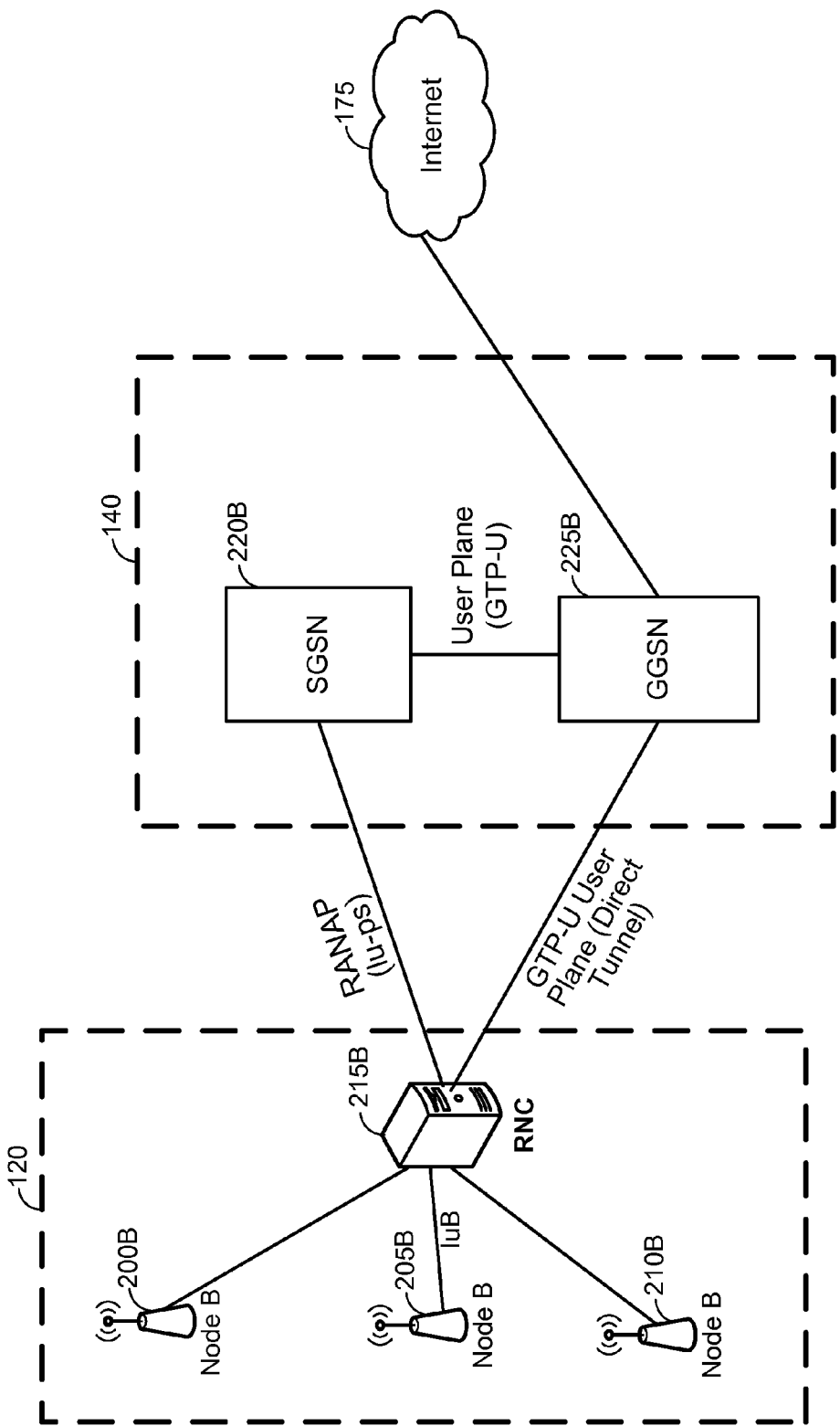
FIG. 2C illustrates another example configuration of the RAN and a packet-switched portion of a GPRS core network within a 3G UMTS W-CDMA system according to one aspect of the disclosure.

FIG. 2C illustrates another example configuration of the RAN 120 and a packet-switched portion of the core network 140 that is configured as a GPRS core network within a 3G UMTS W-CDMA system according to one aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
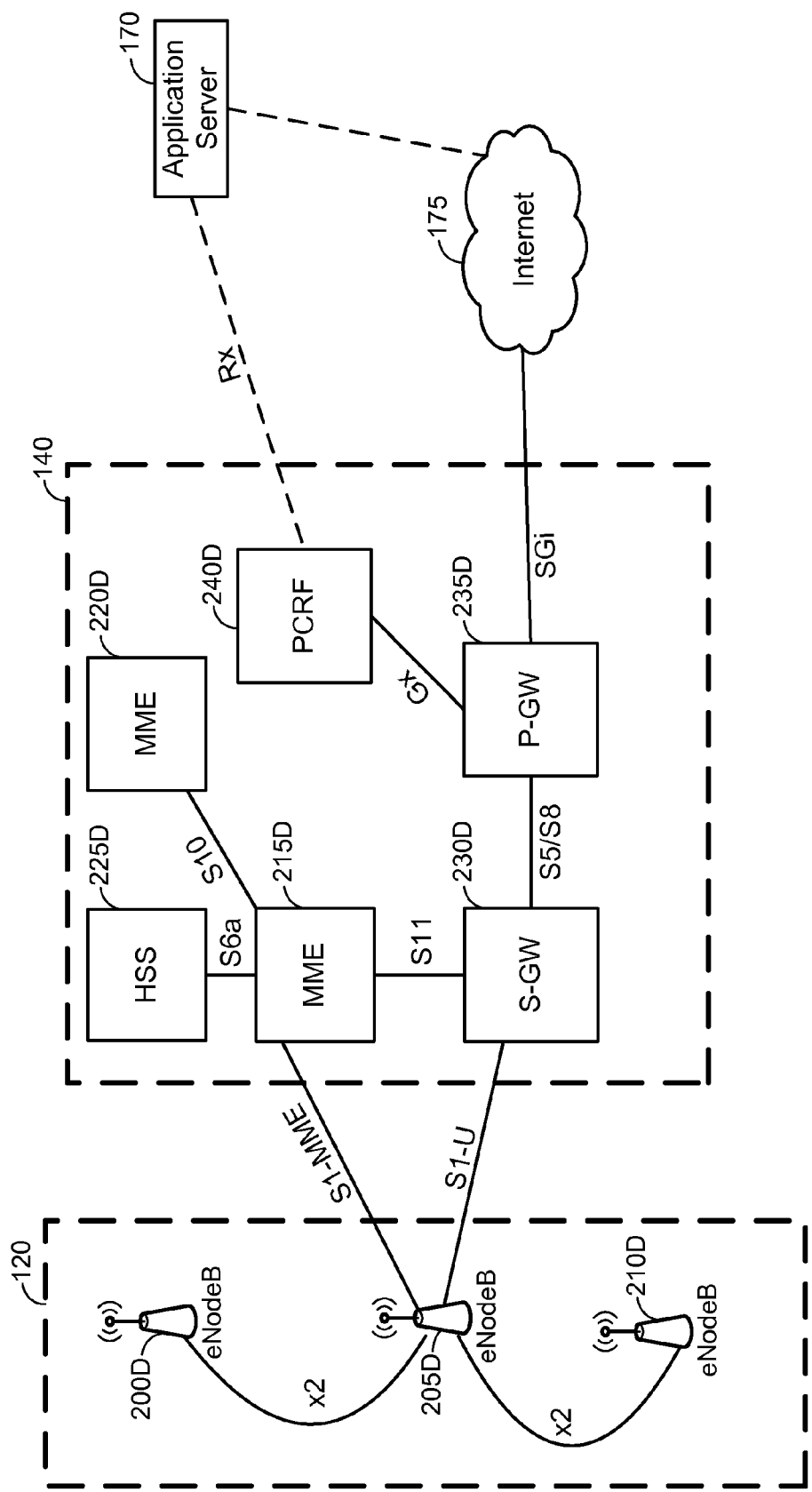
FIG. 2D illustrates an example configuration of the RAN and a packet-switched portion of the core network that is based on an Evolved Packet System (EPS) or Long Term Evolution (LTE) network according to one aspect of the disclosure.

FIG. 2D illustrates an example configuration of the RAN 120 and a packet-switched portion of the core network 140 based on an Evolved Packet System (EPS) or LTE network, according to one aspect of the disclosure. Referring to FIG. 2D, unlike the RAN 120 shown in FIGS. 2B-2C, the RAN 120 in the EPS/LTE network is configured with a plurality of eNodeBs 200D, 205D and 210D, without the RNC 215B from FIGS. 2B-2C. This is because eNodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy and Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
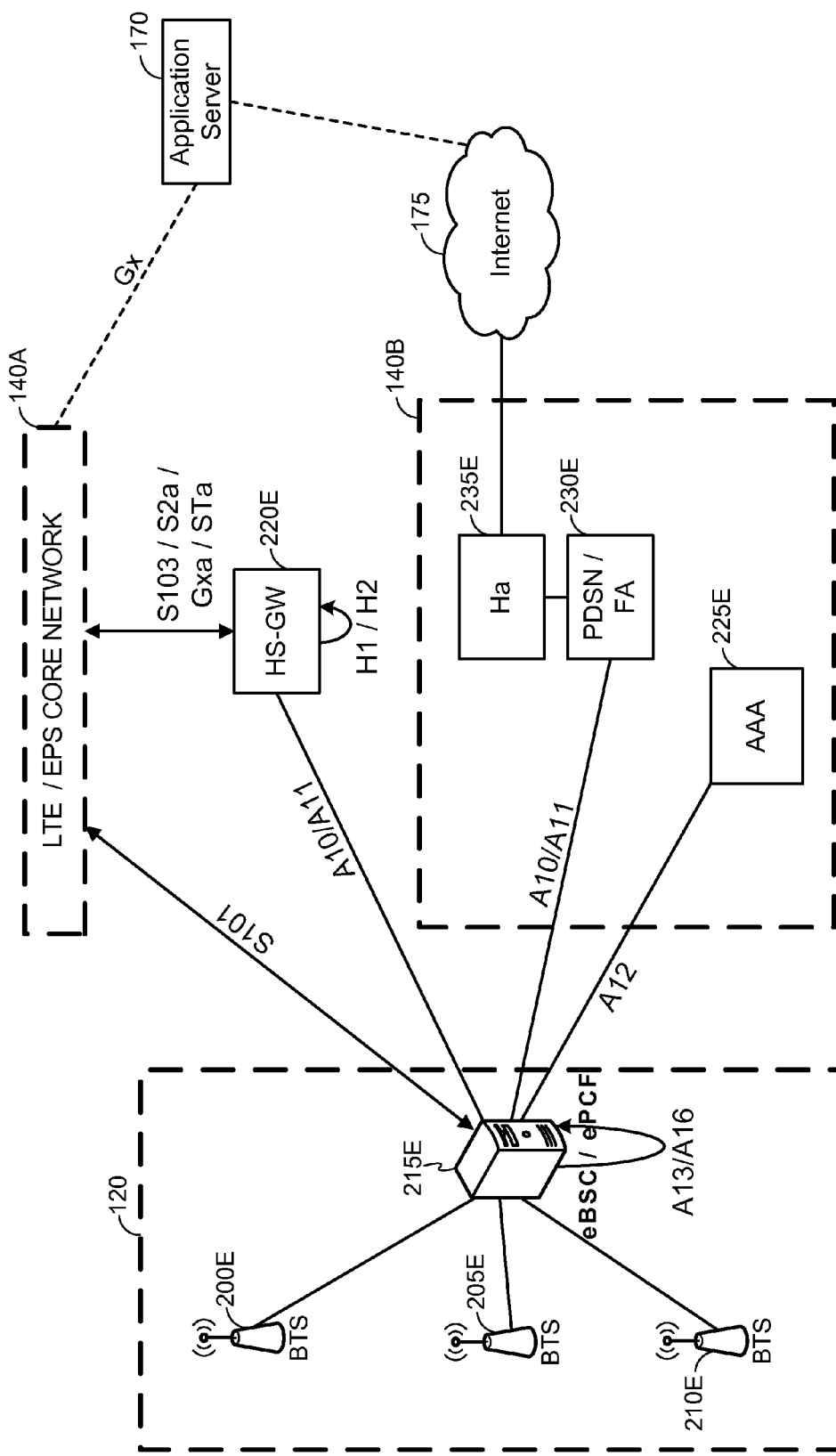
FIG. 2E illustrates an example configuration of an enhanced High Rate Packet Data (HRPD) RAN connected to an EPS or LTE network and also a packet-switched portion of an HRPD core network according to one aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B according to one aspect of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235E, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
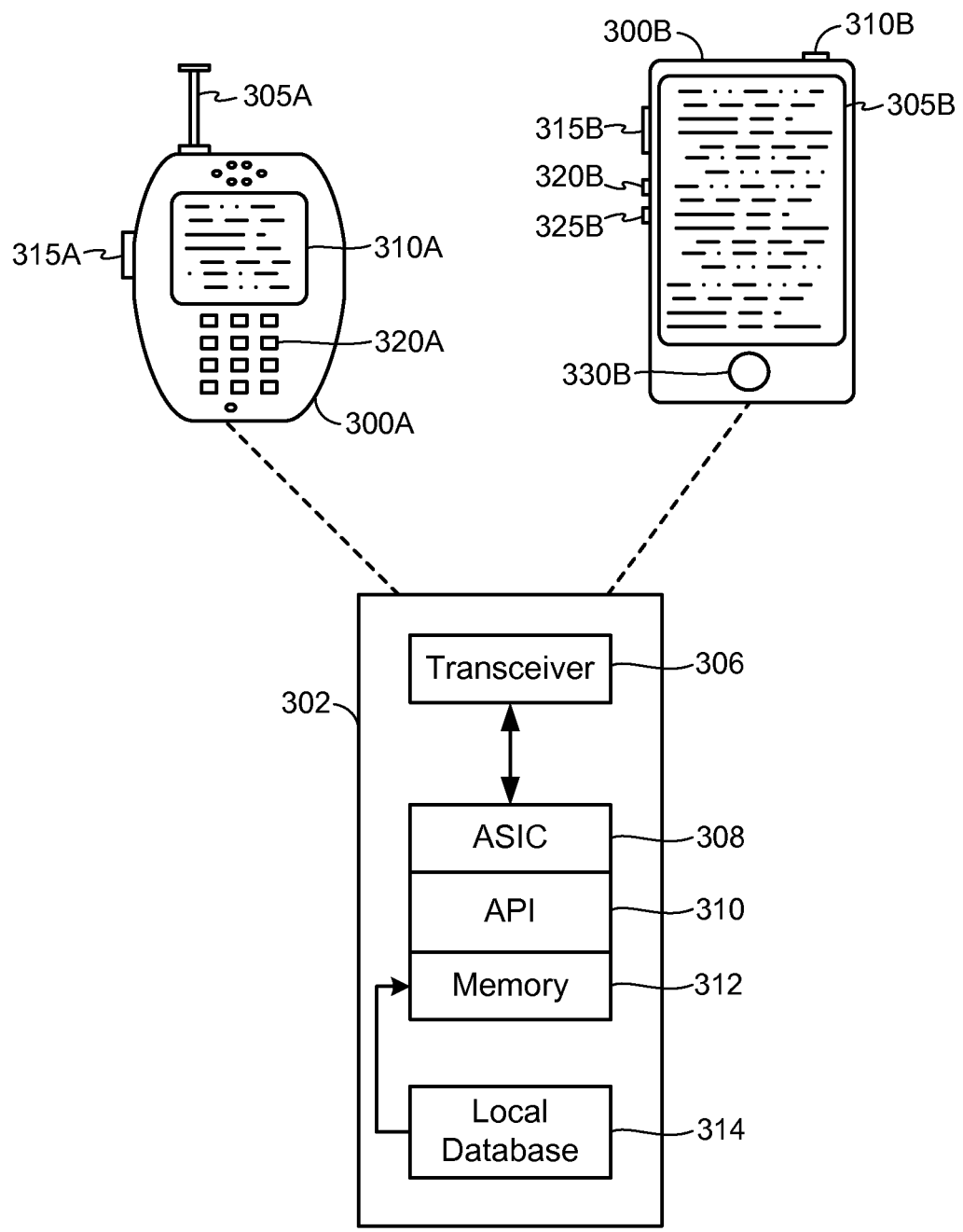
FIG. 3 illustrates examples of user equipments (UEs) according to one aspect of the disclosure.

FIG. 3 illustrates examples of UEs according to one aspect of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to Wi-Fi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, one embodiment disclosed herein can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments disclosed herein and are merely to aid in describing aspects of the embodiments disclosed herein.

Figure 4:
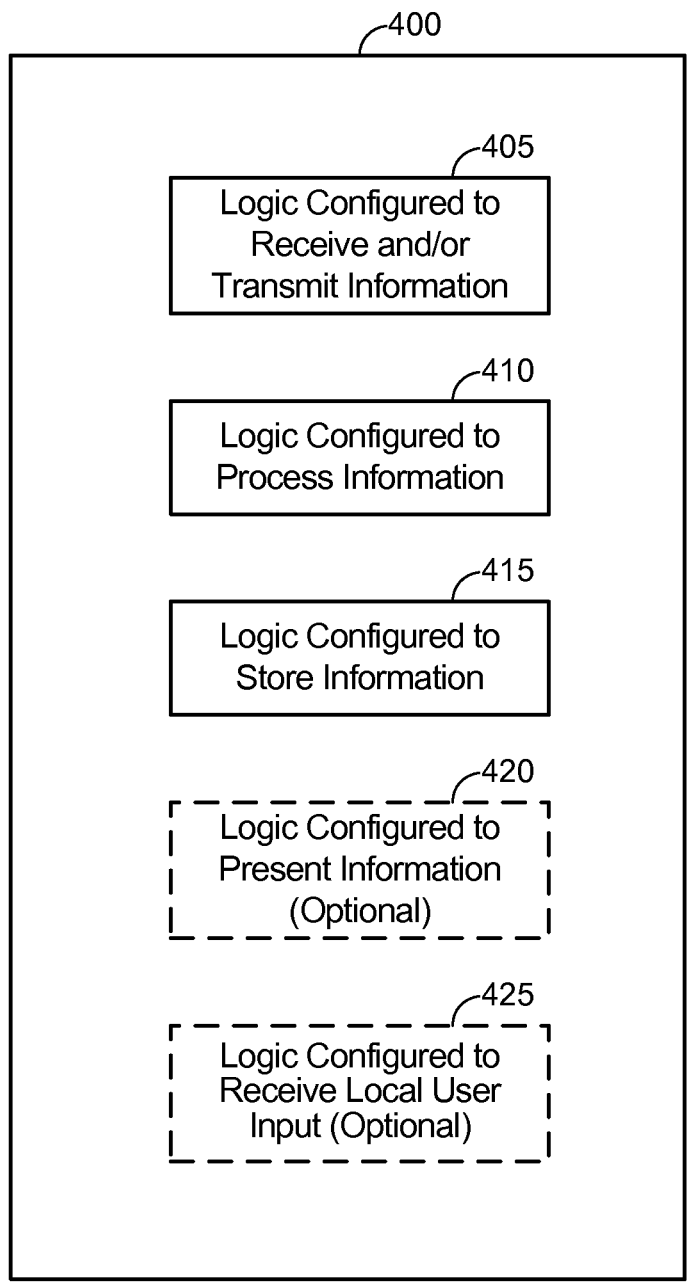
FIG. 4 illustrates a communication device that includes logic configured to perform functionality according to one aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, Wi-Fi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
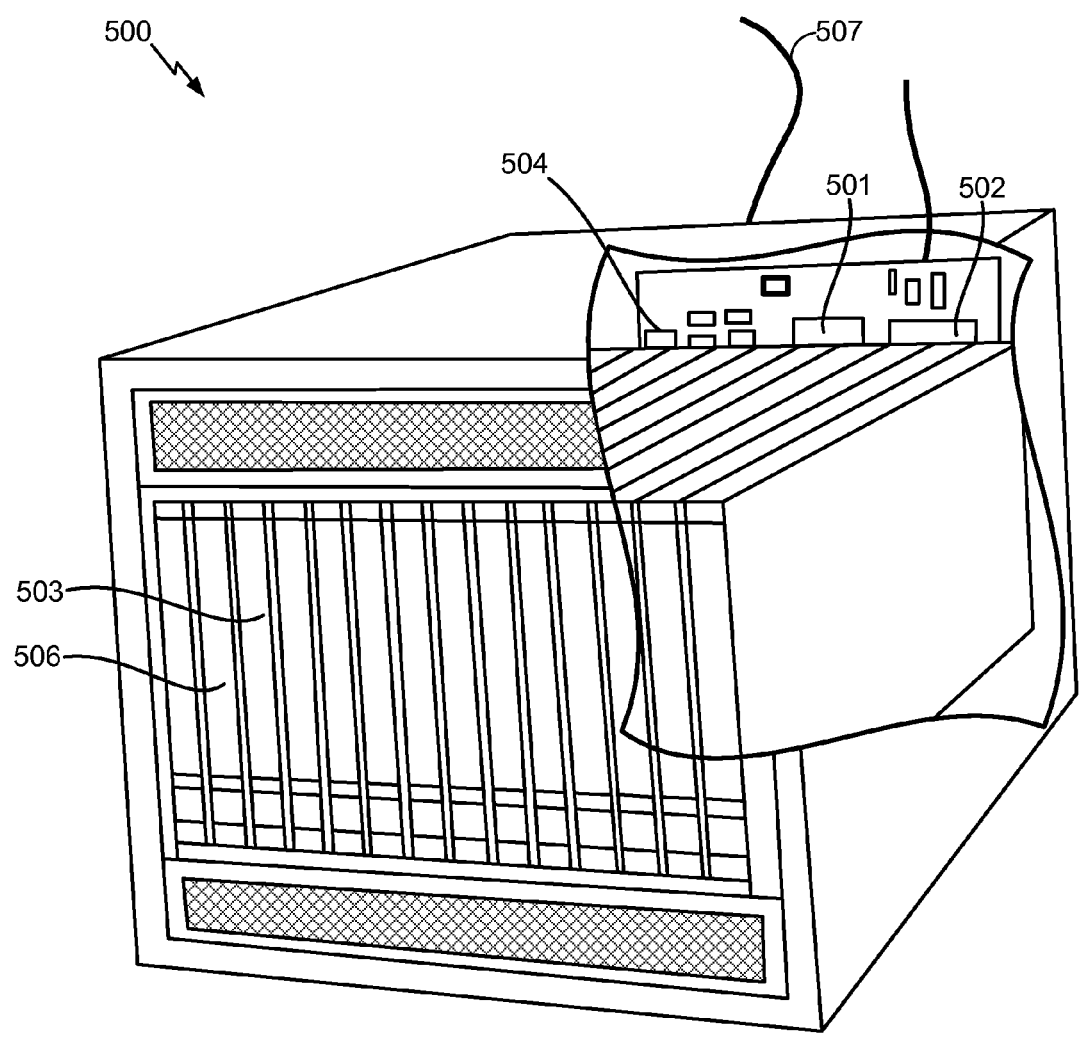
FIG. 5 illustrates an exemplary server according to one aspect of the disclosure.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access points 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 300A or 300B as in FIG. 3.

Sessions that operate over networks such as 1× EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or set up) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions. In certain cases, scheduled always-on (GBR) service for high-priority applications running on a UE or other suitable mobile device may be desirable to improve capacity (e.g., on the UE and/or the network that provides the always-on service) and further to improve resource network usage. For example, real-time communication often requires always-on service to ensure bi-directional IP communication. However, applications that use HTML, Cascading Style Sheets (CSS), JavaScript (JS), and other web clients currently lack the ability to leverage QoS in cellular networks using certain pervasive technologies, such as the WebRTC solution for VoIP, video telephony, and streaming services, among other things. Consequently, these and other web clients may suffer poor voice, video, and other media quality experiences in wireless networks due to higher loss, unguaranteed bandwidth, high jitter, or other performance degradations that may arise when QoS cannot be provided.

Accordingly, the following description provides a solution that can enable QoS capabilities for web clients using WebRTC, RTCWeb, and other pervasive web technologies on a wireless network (e.g., LTE, UMTS, 1× EV-DO, Wi-Fi, etc.) in order to support high efficiency and high performance for VoIP, video, media, and other data services that use pervasive web technologies such as WebRTC and RTCWeb. As such, the solution described in further detail herein may allow QoS-enabled web clients to receive guaranteed performance in a wireless network regardless of the loading in a cellular network, which may translate to very low latency, low jitter, low loss of voice, video, media, and other data packets and better user experience for web clients that use VoIP, video, streaming, and other applications that require guaranteed quality levels. For example, as will be described in further detail below, QoS for web client calls or sessions that are supported in a cellular network via WebRTC or other suitable web technologies may be enabled via network-initiated QoS setup (e.g., on an LTE, UMTS, eHRPD, or other wireless network), explicit device-initiated QoS setup (e.g., on a 1× EV-DO, LTE, UMTS, eHRPD, Wi-Fi, or other wireless network), and/or implicit device-initiated QoS setup (e.g., on any suitable air interface or other wireless network).

Figure 6:
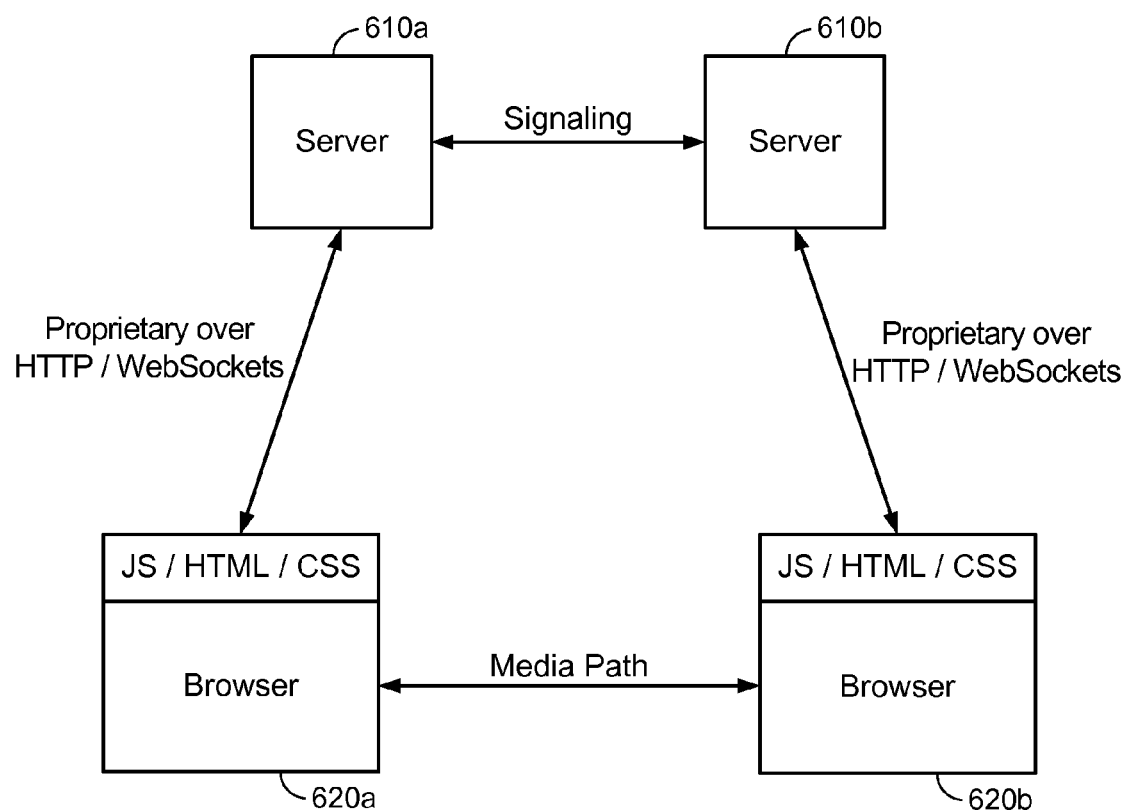
FIG. 6 illustrates a conventional architecture that may support peer-to-peer (P2P) WebRTC communications between UEs.

As way of background, FIG. 6 illustrates a conventional architecture that may support peer-to-peer (P2P) WebRTC communications between UEs. In general, WebRTC (Web Real-Time Communications) refers to a set of APIs that enable real-time communications between browser applications for voice calling, video chat, P2P file sharing, and other browser-to-browser applications without requiring any plug-ins. For example, to establish a WebRTC call or session, a caller browser 620a and a callee browser 620b may contact respective servers 610a and 610b over appropriate HTTP or WebSockets interfaces, wherein the respective servers 610a and 610b may then establish the signaling channels to support a P2P connection between the caller browser 620a and the callee browser 620b. The servers 610a and 610b may then return suitable information relating to the established signaling channels to the caller browser 620a and the callee browser 620b, which may use the information relating to the established signaling channels in order to create a media path or peer connection therebetween. As such, the caller browser 620a and the callee browser 620b may then exchange voice, video, media, or other suitable data over the created media path. However, as noted above, applications that use HTML, CSS, JS, and other web technologies generally cannot leverage QoS in cellular networks, whereby any data communicated over the media path established between the caller browser 620a and the callee browser 620b in the architecture shown in FIG. 6 may suffer from poor quality.

Figure 7A:
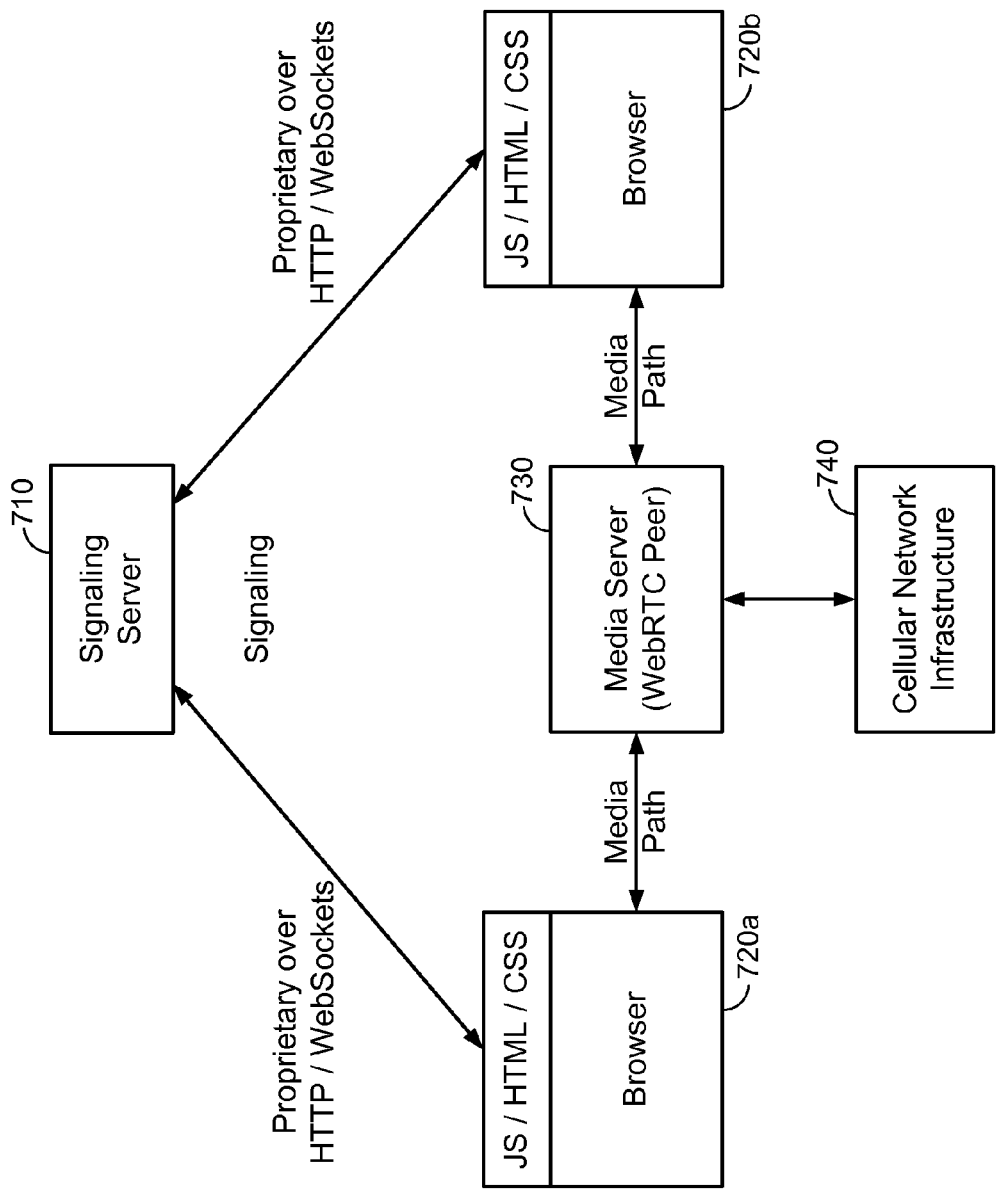
FIGS. 7A-7C illustrate exemplary architectures that may enable QoS for UEs communicating using WebRTC, according to one aspect of the disclosure.

According to one embodiment, FIG. 7A illustrates an exemplary architecture that may enable QoS capabilities for UEs communicating using WebRTC or other suitable web technologies, wherein the architecture shown in FIG. 7A may introduce a media server 730 in the media path between browser 720a and browser 720b to support network-initiated QoS setup (e.g., on an LTE, UMTS, eHRPD, or other wireless network), explicit device-initiated QoS setup (e.g., on a 1× EV-DO, LTE, UMTS, eHRPD, Wi-Fi, or other wireless network), and/or implicit device-initiated QoS setup (e.g., on any suitable air interface or other wireless network). In one embodiment, browsers 720a and 720b may initially contact a signaling server 710 to setup signaling channels using WebSockets, HTTP, or other suitable web technologies and the signaling server 710 may then assign one or more WebRTC PeerConnections during the call establishment phase. For example, the WebRTC PeerConnections may generally allow two users to communicate directly, from browser-to-browser, via a signaling channel that the signaling server 710 coordinates. Each client (e.g., browser 720a and browser 720b) may then establish a WebRTC connection with the media server 730 as the peer endpoint.

In one embodiment, to support network-initiated QoS setup, the media server 730 may then determine whether to activate QoS for the media paths established with the client browser 720a and/or client browser 720b. For example, in one embodiment, the media server 730 may perform network address translation (NAT) discovery to determine an IP address and port associated with the WebRTC connection that the browser 720a and/or browser 720b established therewith, wherein the NAT discovery may indicate the service or application type associated with the WebRTC connection. As such, if the media server 730 determines that the WebRTC connection relates to a service or application type that requires certain QoS guarantees (e.g., voice, video, or streaming media services), the media server 730 may activate an appropriate QoS level for the WebRTC connections established with the browser 720a and/or 720b to initiate QoS on the corresponding media paths. For example, if the media path between the media server 730 and the browser 720a and/or 720b was created on an LTE network, the media server 730 may provide an appropriate QoS class identifier (QCI) of an EPS bearer associated with the IP address and port corresponding to one or more of the browser 720a and/or 720b for which the QoS was activated, wherein the QCI may generally define a set of QoS parameters of the associated EPS bearer (e.g., minimum GBR, maximum delay, etc.) to ensure that the corresponding media path receives preferential treatment at all components within the LTE backhaul infrastructure. In a similar manner, if the media path between the media server 730 and the browser 720a and/or 720b is created on an eHRPD network, the media server 730 may provide the appropriate QoS parameters (e.g., minimum GBR, maximum delay, etc.) and the IP address and port corresponding to one or more of the browser 720a and/or 720b for which the QoS was activated to the eHRPD network infrastructure components to ensure that the corresponding media path receives appropriate preferential treatment.

Figure 7B:
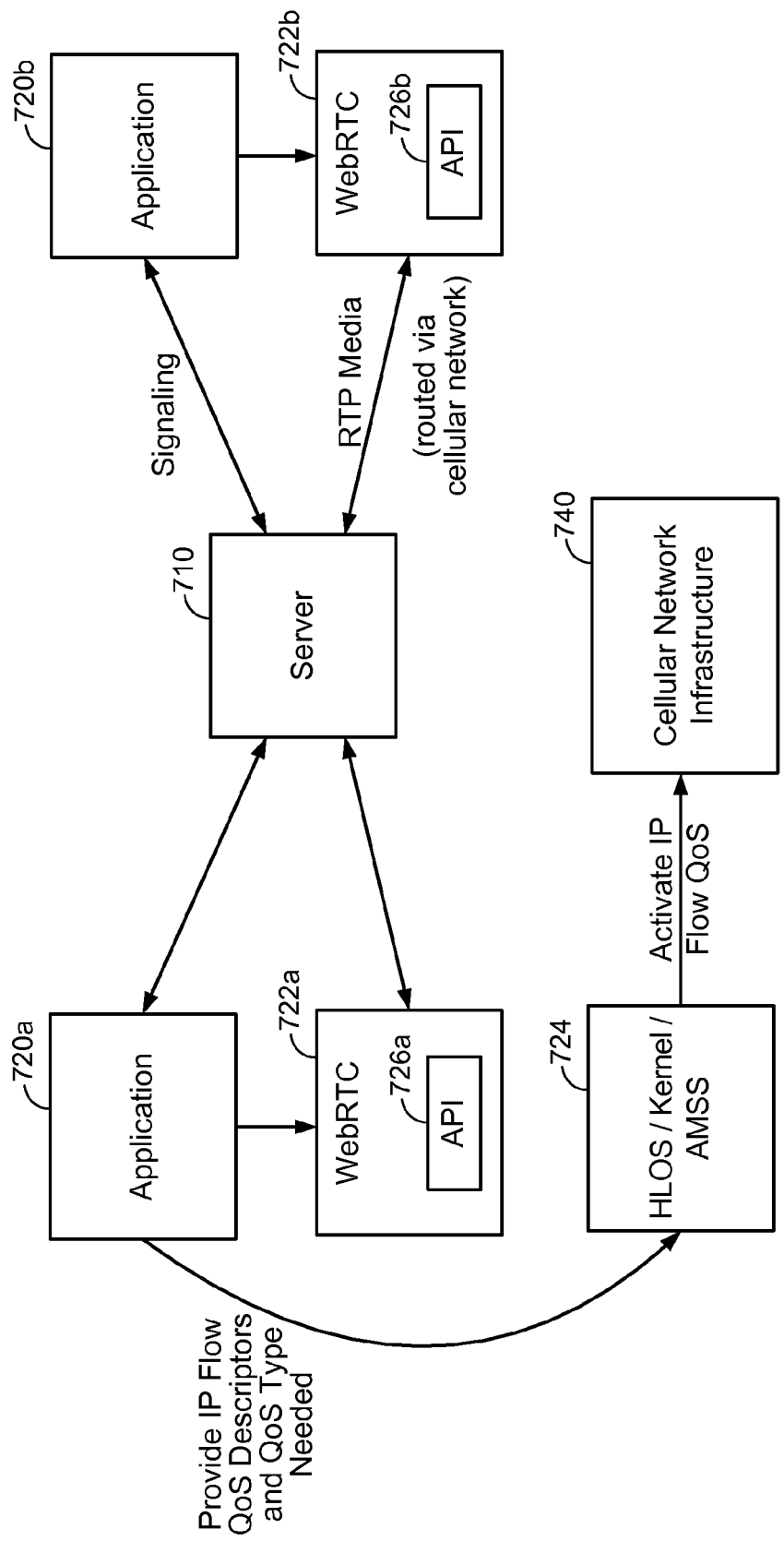

Accordingly, in one embodiment, the media server 730 may generally operate as the application server 170 shown in FIG. 2D and FIG. 2E, wherein the media server 730 may support communication services for browsers 720 that can connect to the media server 730 via a core cellular network infrastructure 740 and/or the Internet to leverage QoS for applications that use IP bearer resources with the core network (e.g., VoIP sessions, PTT sessions, group communication sessions, social networking services, etc.). For example, to meet tight end-to-end latency or other QoS requirements associated with signaling and data exchanged in the WebRTC or other web-based session, the media server 730 may communicate with the cellular network infrastructure 740 to activate the QoS for the WebRTC flow via the Rx interface, wherein the activated QoS may prioritize signaling and data traffic over other application traffic at the routers in the cellular network infrastructure 740 that lie between the eNodeB and S-GW and thereby reduce backhaul delays associated with the prioritized signaling and data traffic. More specifically, the eNodeB can mark IP data packets received on bearers with specific DSCP markings that distinguish that traffic from all other traffic on the cellular network 740 to give the traffic expedited forwarding treatment at the routers in the backhaul cellular network infrastructure 740. As shown in FIGS. 7A-B, the media server 730 may thereby route or otherwise forward the traffic between browser 720a and browser 720b via the appropriate cellular network infrastructure 740 to utilize the activated QoS associated with the traffic between browser 720a and browser 720b. Furthermore, those skilled in the art will appreciate that that the media server 730 may appropriately activate QoS on the signaling IP port when the call is received on a web socket.

According to one embodiment, FIG. 7B illustrates another exemplary architecture that may enable QoS capabilities for UEs communicating using WebRTC or other suitable web technologies. In general, the architecture shown in FIG. 7B may be substantially similar to the architecture shown in FIG. 7A except that further detail is shown with respect to the components and functionality associated with the browsers 720a and/or 720b. Furthermore, FIG. 7B generally shows a server 710 that combines the functionality associated with the signaling server 710 and the media server 730 shown in FIG. 7A. However, those skilled in the art will appreciate that this is for ease of illustration and description only, in that the server 710 may include separate servers to handle signaling and media paths between browsers 720a and 720b.

In one embodiment, in addition to supporting network-initiated QoS setup in the manner described above, the architectures shown in FIG. 7A and FIG. 7B may further support explicit and/or implicit client-initiated QoS setup. In particular, to support explicit client-initiated QoS setup, a WebRTC component may provide an API for one or more applications to specify certain capabilities to enable QoS. For example, as shown in FIG. 7B, WebRTC components 722a and 722b may respectively provide APIs 726a and 726b, which applications 720a and 720b may respectively use to specify the capabilities to enable QoS. As such, the API 726a and the API 726b may generally enable respective applications 720a and 720b to specify capabilities that may include, among other things, bandwidth and service type (e.g., conversational voice, video stream, streaming data, interactive data, best-effort, etc.). Furthermore, if a particular application 720 will communicate over an LTE or EV-DO/eHRPD cellular network 740, the service type specified via the API 726 provided by the corresponding WebRTC component 722 may further include a QCI or QoS profile identifier and an APN, wherein a UMTS cellular network 740 may map the APN to an appropriate IP address used therein. As such, in one embodiment, the application 720 may use the API 726 to specify whether the requested service requires QoS when initiating a call via WebRTC component 722 and may further specify the QoS type if required. Alternatively, in one embodiment, the application 720 may predetermine the required QoS (e.g., one or more QCIs) upon initialization with the WebRTC stack component 722, which may integrate with various air interface drivers to negotiate the appropriate QoS with LTE, UMTS, EV-DO, Wi-Fi, eHRPD, or other cellular network infrastructures 740. Further still, the WebRTC stack component 722 may activate QoS for the appropriate flow at the time that a call is received in addition to or alternatively to the time that a call is initiated (e.g., based on whether the call is associated with voice, video, data streaming, or another suitable media type, feature, or characteristic).

In one embodiment, the implicit client-initiated QoS setup may generally employ the same or a substantially similar call establishment and media exchange communication flow as described above with respect to the network-initiated QoS setup, except that the media server 730 (as in FIG. 7A) or server 710 (as in FIG. 7B) does not initiate the QoS setup procedure. Instead, at the time that a client application (e.g., application 720a) originates a call, the application 720a may use the WebRTC stack component 722a to indicate that a call is being established to resident client software 724. For example, in one embodiment, the client software 724 to which the application 720a indicates that the call is being established may comprise a high-level operating system component (HLOS), kernel, advanced mobile subscriber software (AMSS), or other suitable resident software. In one embodiment, as part of the signaling exchange over WebSockets, the client application 720a may determine the IP address, port, protocol (e.g., UDP) or other suitable connection data that the server 710 allocated to support the call may use to subsequently monitor the corresponding IP flow to detect any data activity thereon. Accordingly, in response to detecting data activity on the corresponding IP flow that has certain QoS requirements, the client application 720a may instruct the resident client software 724 to activate QoS on the corresponding IP flow. For example, in one embodiment, the client application 720*a* may provide all appropriate QoS descriptors for the IP flow and the type of QoS needed to the resident client software (e.g., the QoS profile identifier and reservation labels on an EV-DO cellular network 740, a QCI on an LTE cellular network 740, etc.), whereby the resident client software 724 may then communicate with the cellular network 740 to activate the appropriate QoS for the call.

Figure 7C:
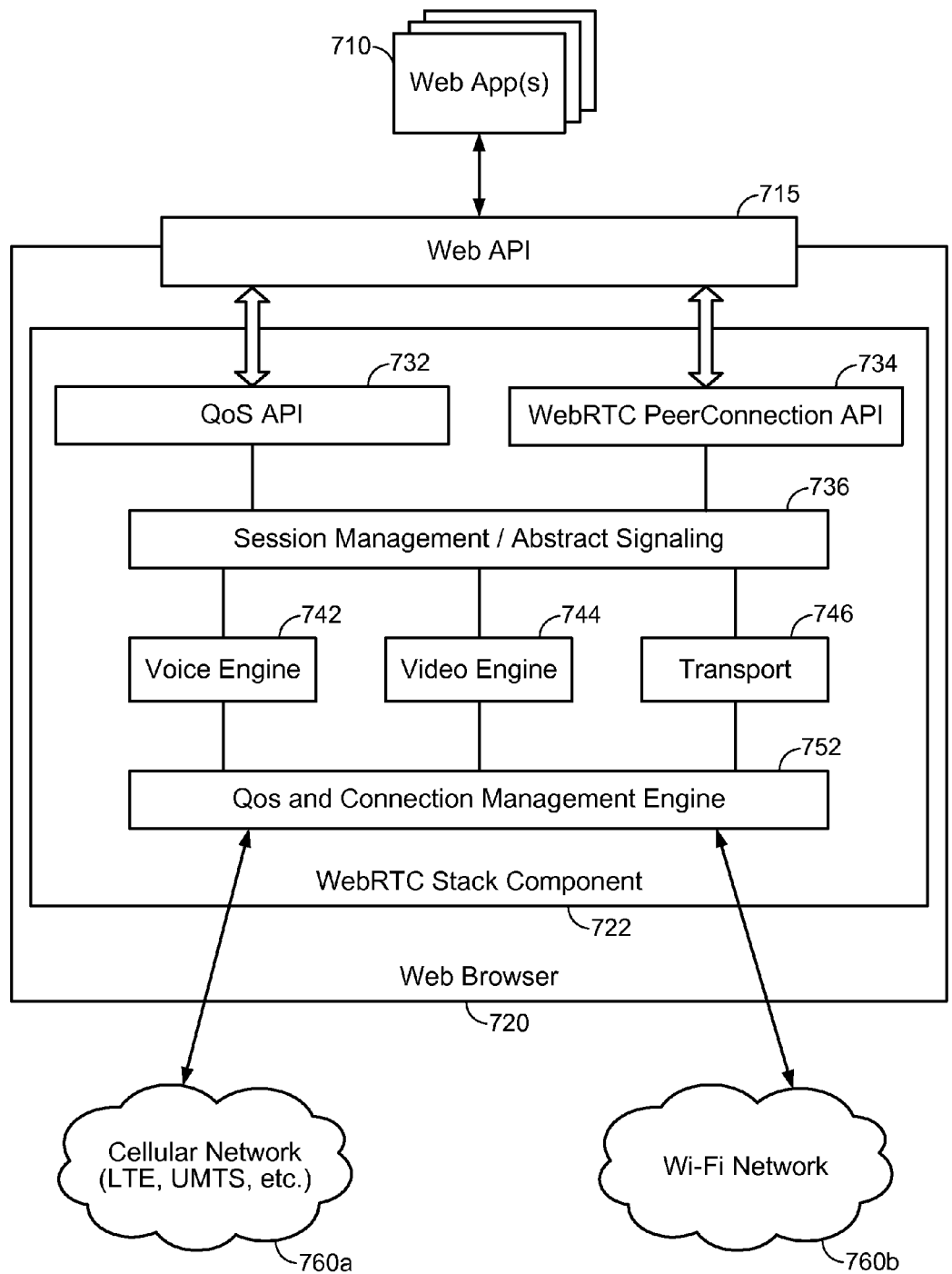

According to one aspect of the disclosure, FIG. 7C illustrates an exemplary WebRTC client architecture that may support at least the explicit and implicit client-initiated QoS setup procedures described above, wherein the WebRTC client architecture shown in FIG. 7C may generally include one or more modifications to standard WebRTC APIs and functionality associated therewith. More particularly, WebRTC is generally a free and open source project that may enable a web browser 700 with Real-Time Communications (RTC) capabilities via simple JavaScript APIs, wherein the standard WebRTC architecture includes a first layer with a WebRTC PeerConnection API 734 and various capture and render hooks and a second layer that includes a web API 715. In particular, third-party developers may use the web API 715 to develop web-based applications 710 (e.g., video chat applications) and the WebRTC PeerConnection API 734 may enable browser developers to implement the web API 715. Furthermore, an abstracted session management and signaling layer 736 may generally allow call setup and management procedures according to application-specific implementations, while a voice engine 742 may provide a framework to manage an audio media chain (e.g., from a sound card to the network), a video engine 744 may provide a framework to manage a video media chain (e.g., from a camera to the network and from the network to a screen), and various transport and/or session components 746 may support establishing connections across various networks (e.g., a cellular network 760*a*, a Wi-Fi network 760*b*, etc.). However, as noted above, WebRTC is not optimized to support QoS (e.g., in cellular networks) that can otherwise provide high-quality performance (e.g., enhanced voice quality, reduced latency, loss, and jitter, etc.).

Accordingly, in order to support the explicit client-initiated QoS setup procedures described above, the WebRTC client architecture shown in FIG. 7C may provide a QoS API 732 that web applications 710 can use to specify various capabilities to enable QoS, wherein the capabilities that can be specified using the QoS API 732 may include a service type (e.g., conversational voice, video streaming, streaming data, interactive, best-effort, etc. or QCI/QoS Profile IDs in LTE, EVDO/eHRPD, or other cellular networks 760*a*), bandwidth, an access point name (APN) that LTE and/or UMTS cellular networks 760*a* use to map to an appropriate IP address. Accordingly, when a web application 710 initiates a WebRTC call, the web application 710 can specify whether QoS is required for the call and the type of QoS that may be required if applicable. Alternatively, in one embodiment, the web application 710 may predetermine the QoS that may be needed (e.g., one or more QCIs) in advance upon initialization with the WebRTC stack component 722, which may be modified to include a QoS and connection management engine 752 that integrates with various air interface drivers among the transport and/or session components 746 in order to negotiate QoS with LTE, UMTS, EVDO, and eHRPD cellular networks 760*a* or to negotiate QoS with a Wi-Fi network 760*b*. In either case, when the web application 710 originates or receives a call, QoS can therefore be activated for the appropriate flow (e.g., based on the media type or feature, such as voice, video, data streaming, etc.).

Furthermore, in one embodiment, the WebRTC client architecture shown in FIG. 7C may support the implicit client-initiated QoS setup procedures described above in a similar manner to that described in further detail above with respect to the network-initiated and explicit client-initiated QoS setup procedures. However, the implicit client-initiated QoS setup procedures may differ in that when a web application 710 using WebRTC originates a call, the web application 710 may indicate to a resident high-level operating system (HLOS), kernel, or other resident software (not shown) that the web application 710 is initiating a call. As such, during a WebSockets signaling exchange, the web application 710 may determine the IP address, port number, protocol (e.g., UDP), or other suitable information associated with the IP flow that the network has allocated to support the call and indicate to the resident software to activate QoS if there is any data activity on the specific IP flow. For example, in response to detecting activity on a specific IP flow that requires QoS, the web application 710 may indicate all the appropriate QoS information (e.g., QoS Profile ID/Reservation Labels on an EVDO cellular network 760*a*, QCI on an LTE cellular network 760*a*, etc.) to enable the HLOS, kernel, or other resident software to activate the appropriate QoS.

Figure 8A:
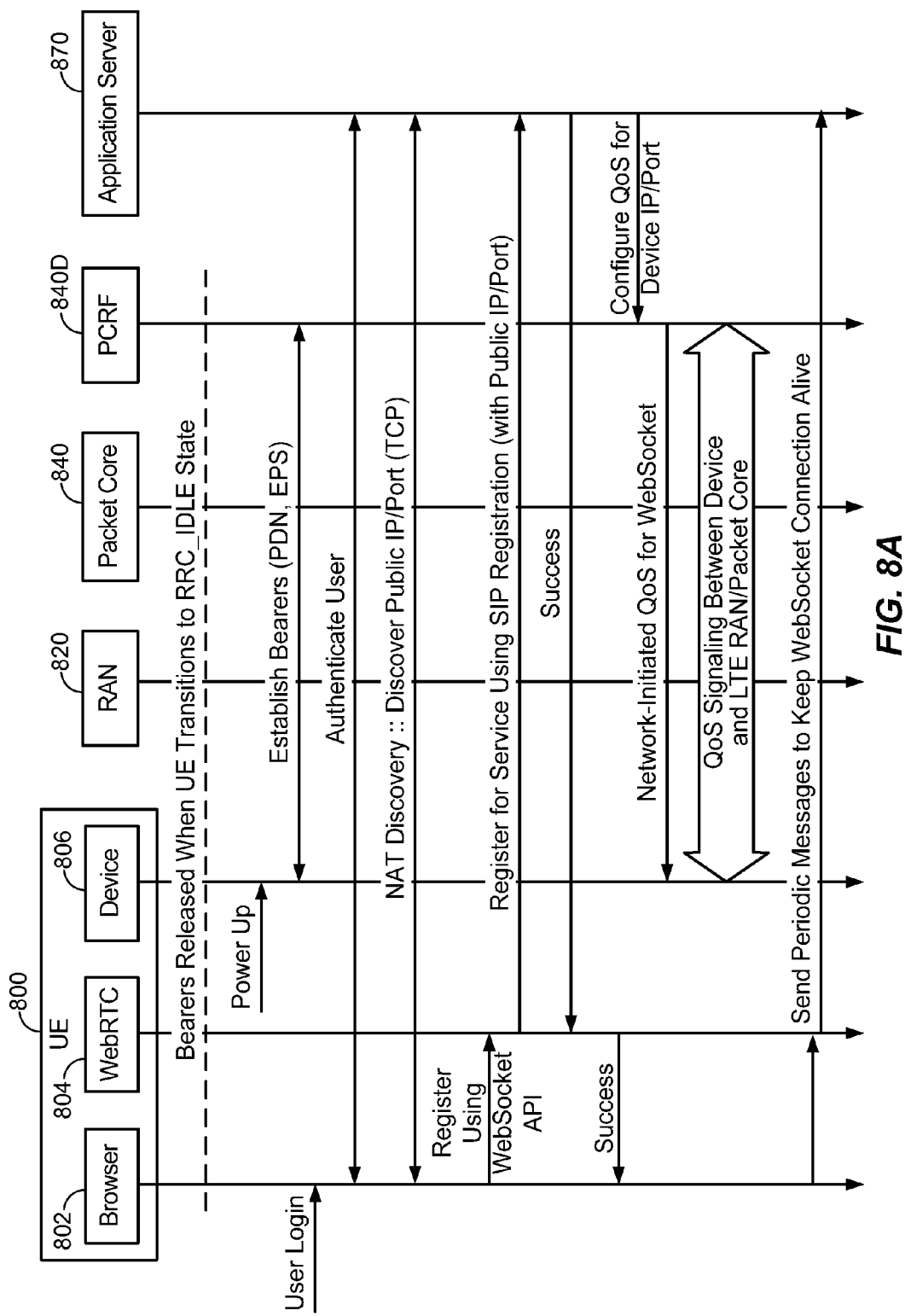
FIGS. 8A-8B illustrate an exemplary communication flow to enable network-initiated QoS for WebRTC clients, according to one aspect of the disclosure.
Figure 8B:
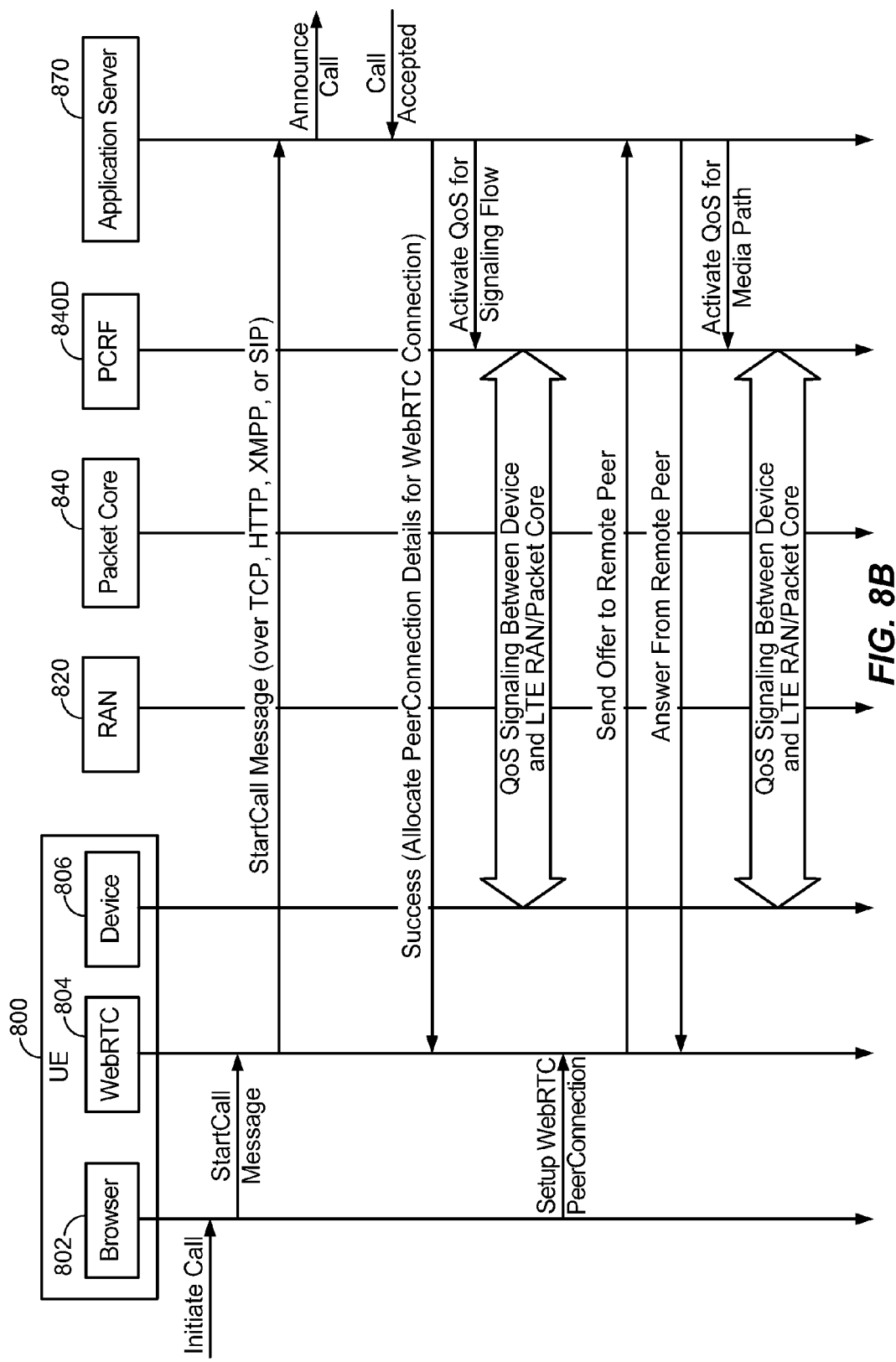

According to one embodiment, FIGS. 8A-8B illustrates an exemplary communication flow to enable QoS capabilities for a UE 800 communicating using a WebRTC component 804 other suitable web technologies. In one embodiment, the communication flow shown in FIGS. 8A-8B may generally refer to messages that are exchanged to support the network-initiated QoS setup described in further detail above. However, those skilled in the art will appreciate that the explicit and implicit client-initiated QoS setup procedures described above may employ a generally similar communication flow, except that there may be various additional messages exchanged between client-side components associated with a device 806 that may originate or receive a call that has certain QoS requirements and various additional messages exchanged between the client-side components and the network infrastructure components in order to activate QoS. Furthermore, although the communication flow shown in FIGS. 8A-8B may generally be described in relation to an LTE-based network, those skilled in the art will appreciate that other embodiments can be directed to other types of network architectures and/or protocols.

In one embodiment, the communication flow shown in FIGS. 8A-8B may be initiated in response to a device 806 powering up in an LTE network, wherein the device 806 may then exchange one or more messages with a Policy and Charging Rules Function (PCRF) component 840D to establish one or more packet data network (PDN) and Evolved Packet System (EPS) bearers. In one embodiment, a user may then log in to a web browser 802 on the device 806 and one or more messages may be exchanged with an application server 870 to authenticate the user. In response to suitably authenticating the user, the application server 870 and the web browser 802 may exchange one or more messages to perform NAT discovery, which may include the web browser 802 discovering a public IP address and port (e.g., a TCP port) associated with the application server 870 and the application server 870 similarly discovering a public IP address and port (e.g., a TCP port) associated with the web browser 802. In one embodiment, the web browser 802 may then use a WebSockets API to register with a WebRTC stack component 804, which may register for service with the application server 870 using Session Initiation Protocol (SIP) with a public IP address and TCP port. In response to the application server 870 successfully registering the WebRTC stack component 804 for service, the application server 870 may then send a message indicating that the registration was successful to the WebRTC stack component 804, and the WebRTC stack component 804 may notify the web browser 802 that the registration succeeded.

In one embodiment, subsequent to successfully registering the WebRTC stack component 804 for service and indicating that the registration was successful to the WebRTC stack component 804, the application server 870 may communicate with the PCRF 840D to configure QoS for the IP address and port associated with the device 806, wherein the PCRF 840D may initiate QoS for the WebSocket associated with the device 806 and return a message indicating the initiated QoS to the device 806. Thereafter, one or more QoS signaling messages may be exchanged between the device 806 and the LTE RAN 820 and/or packet core 840 to establish the appropriate signaling channels. In one embodiment, the web browser 802 may periodically send one or more keep-alive messages to the WebRTC stack component 804, which may forward the keep-alive messages to the application server 870 to keep the WebSocket connection alive. In one embodiment, the user may then initiate a call (e.g., a VoIP call) over the WebSocket connection via the web browser 802, which may send a StartCall message to the WebRTC stack component 804 over the WebSocket connection. In response thereto, the WebRTC stack component 804 may forward the StartCall message to the application server 870 over TCP, HTTP, XMPP, SIP, RTP, S-RTP, or another suitable protocol, and the application server 870 may send an AnnounceCall message to the target associated with the StartCall message. In response to receiving a message from the target indicating that the call was accepted, the application server 870 may then send a success message to the WebRTC stack component 804. For example, in one embodiment, the success message may allocate PeerConnection details for the WebRTC connection in order to enable communication between the browser 802 on the call originator device 806 and the browser on the call target device (not shown).

In one embodiment, in response to allocating the PeerConnection details for the WebRTC connection, the application server 870 may further communicate with the PCRF 840D to activate QoS for a signaling flow associated with the call to the extent that QoS has not already been activated for the signaling flow. Thereafter, one or more further QoS signaling messages may be exchanged between the device 806 and the LTE RAN 820 and/or packet core 840 to establish the appropriate signaling channels and the web browser 802 at the device 806 may send a message to the WebRTC stack component 804 to setup a WebRTC PeerConnection with the application server 870. Accordingly, the WebRTC stack component 804 may send an offer to the application server 870 as a remote peer and the application server 870 may respond with an answer indicating whether the application server 870 accepts the offer to establish the PeerConnection as the remote peer. As such, if the application server 870 accepts the offer to establish the PeerConnection as the remote peer, the application server 870 may again contact the PCRF 840D to activate QoS for a RealTime Transport Protocol (RTP) or Secure RTP (S-RTP) media path between the application server 870 and the device 806, which may be followed by one or more further QoS signaling messages exchanged between the device 806 and the LTE RAN 820 and/or packet core 840 to establish the appropriate media channels. At this point, all appropriate signaling and media channels have been established with the appropriate QoS requirements, whereby the application server 870 may coordinate a browser-to-browser data exchange at the appropriate QoS level.

Figure 9A:
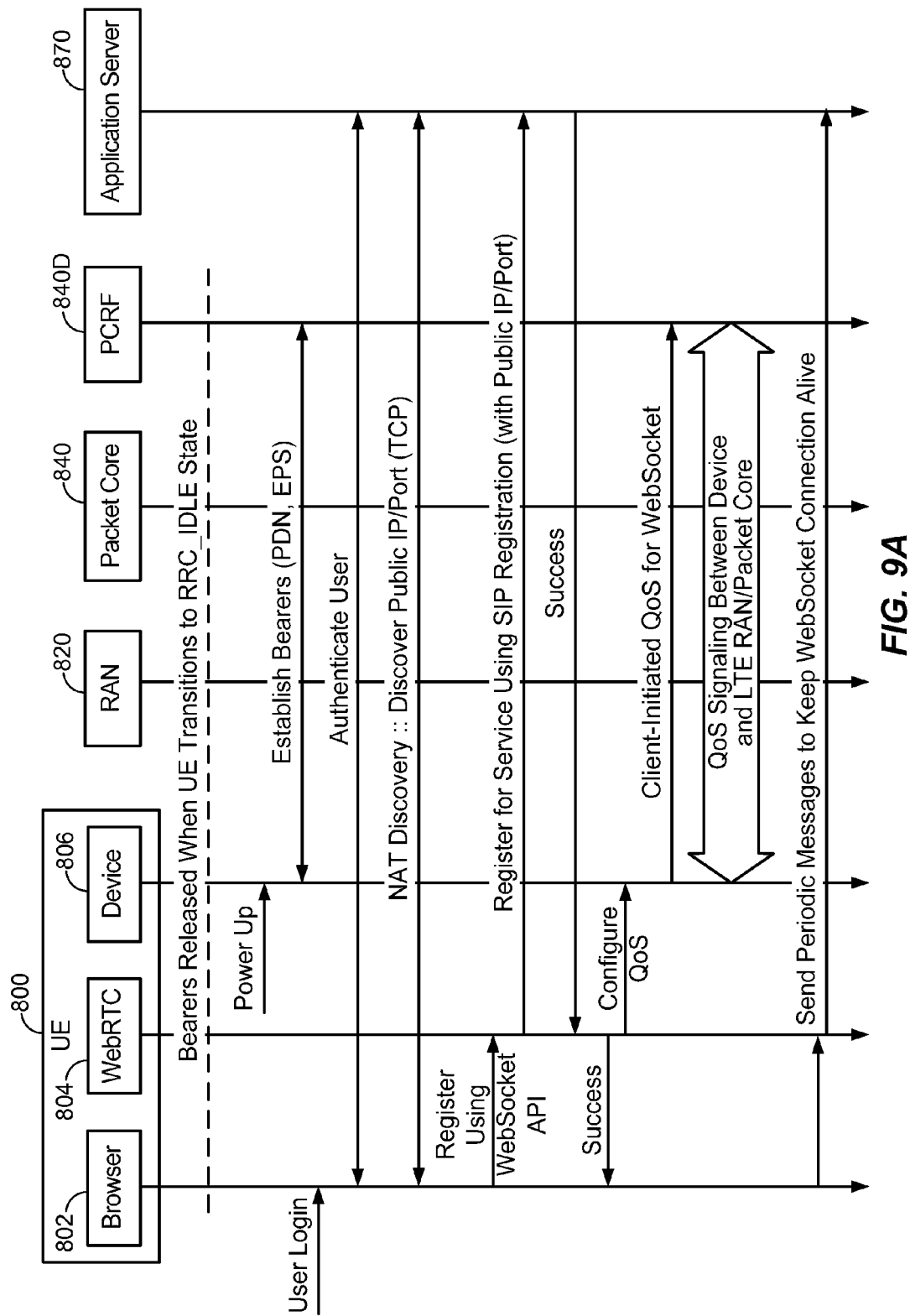
FIGS. 9A-9B illustrates an exemplary communication flow to enable client-initiated QoS for WebRTC clients, according to one aspect of the disclosure.
Figure 9B:
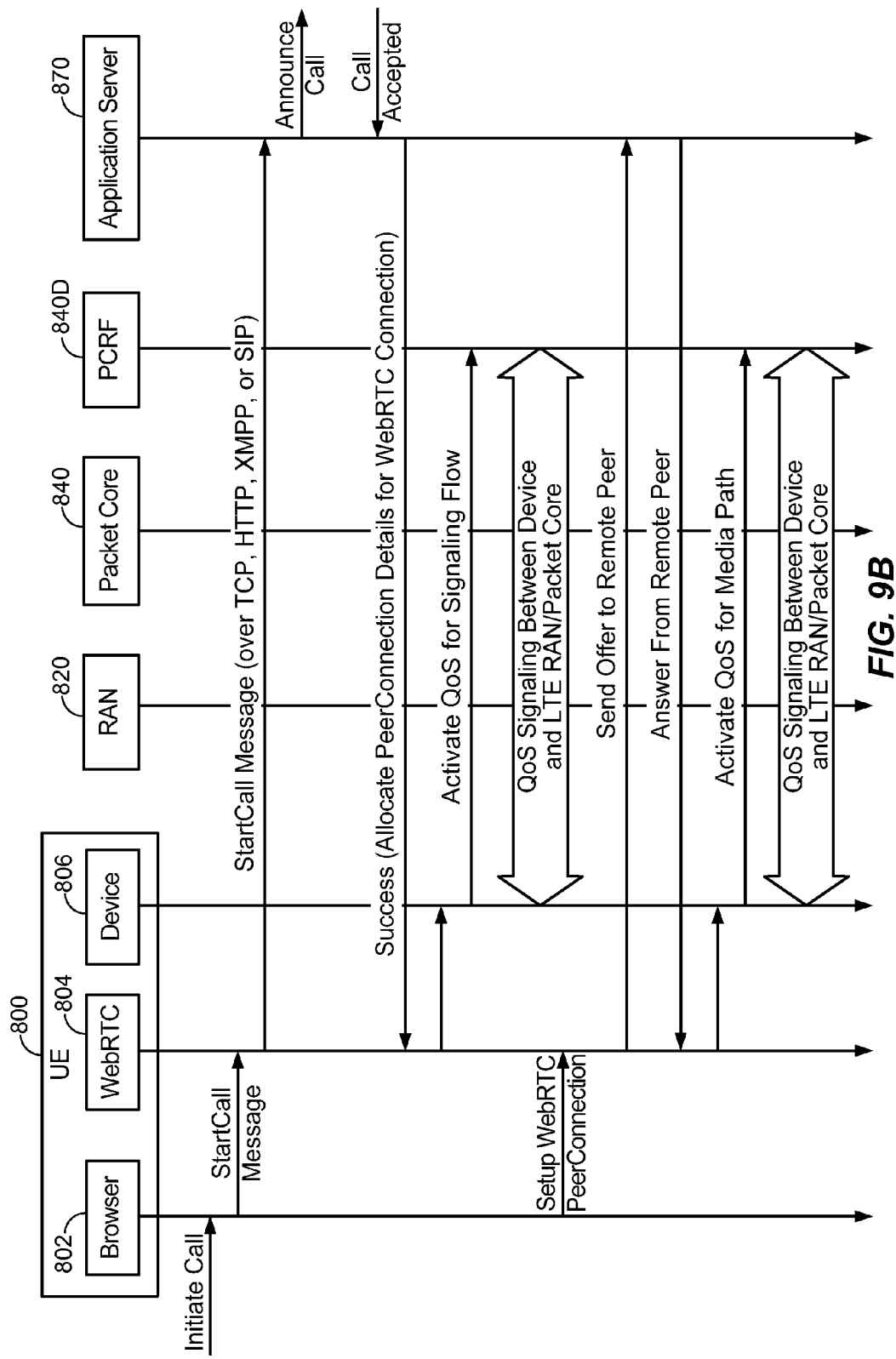

According to one aspect of the disclosure, FIGS. 9A-9B illustrates another exemplary communication flow to enable client-initiated QoS for WebRTC clients. More particularly, as noted above, the call flow associated with the client-initiated QoS procedures may be substantially similar to the call flow shown in FIGS. 8A-8B with respect to the network-initiated QoS procedures described above. As such, for brevity and ease of description, various details relating to the call flow shown in FIGS. 9A-9B are omitted herein to the extent that the same or a substantially details have already been provided above.

In one embodiment, the call flow shown in FIGS. 9A-9B may support explicit client-initiated QoS setup procedures via a WebRTC stack component 804 that includes an appropriate API that web applications executing on a web browser 802 can use to specify various capabilities to enable QoS (e.g., service type, bandwidth, an access point name (APN) to map to an appropriate IP address, etc.). Accordingly, when a web application initiates a WebRTC call and successfully registers with the application server 870, the web application can then specify whether QoS is required for the call and configure the type of QoS that may be required if applicable, wherein the UE 800 may then communicate with the PCRF 840D to initiate the QoS setup for WebSockets prior to engaging in a QoS signaling exchange with an LTE RAN 820 and/or packet core 840. Alternatively, as noted above, the web application may predetermine the QoS that may be needed (e.g., one or more QCIs) in advance upon initialization with the WebRTC stack component 804, which may integrate with various air interface drivers in order to negotiate QoS over the LTE RAN 820 and/or packet core 840. In either case, when the web application originates a call to a target UE or receives a call from an originating UE and receives a message from the application server 870 that provides PeerConnection details for the WebRTC connection associated with the call, the QoS can then be activated for the appropriate flow (e.g., based on the media type or feature, such as voice, video, data streaming, etc.). Furthermore, the implicit client-initiated QoS setup procedures may operate in a similar manner, except that when the web application originates a call, the web application may indicate to the HLOS, kernel, or other software resident on the device 806 that the web application is initiating a call, wherein the web application may determine the IP address, port number, protocol, or other suitable information associated with the IP flow that the network has allocated to support the call based on information exchanged during the NAT discovery phase. As such, the web application may indicate to the resident software on the device 806 to activate QoS if there is any data activity on the specific IP flow and indicate all the appropriate QoS information that the HLOS, kernel, or other resident software on the device 806 may use to communicate with the LTE RAN 820 and/or packet core 840 to configure and activate the appropriate QoS.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for implementing quality of service (QoS) for a web-based platform, comprising:
   exchanging, over a wireless network in a call establishment phase, one or more signaling messages between a server and a first user equipment (UE) to establish a browser-to-browser call between the first UE and a second UE;
   specifying, by the first UE via a QoS application program interface in the web-based platform, one or more QoS requirements for configuring and activating a guaranteed QoS level when originating the browser-to-browser call or receiving a request to establish the browser-to-browser call;
   configuring the guaranteed QoS level for the browser-to-browser call between the first UE and the second UE during the call establishment phase based on the one or more QoS requirements specified via the QoS application program interface in the web-based platform;
   establishing, by the first UE, a peer-to-peer connection with the server as a remote peer endpoint, wherein the peer-to-peer connection with the server provides a media path for the browser-to-browser call between the first UE and the second UE; and
   activating, by the first UE, the configured guaranteed QoS level for the browser-to-browser call in response to establishing the peer-to-peer connection with the server according to the one or more QoS requirements associated with the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

2. The method recited in claim 1, wherein the server further communicates with an infrastructure in the wireless network to guarantee the QoS level during the browser-to-browser call regardless of loading in the wireless network.

3. The method recited in claim 1, wherein the server provides at least a QoS class identifier (QCI), an IP address, and a port associated with the peer connection established with the first UE to configure the guaranteed QoS level.

4. The method recited in claim 1, wherein the server routes the data associated with the browser-to-browser call using one or more of Real-Time Transport Protocol (RTP) or Secure RTP (S-RTP).

5. The method recited in claim 1, further comprising:
activating the guaranteed QoS level for a signaling IP port used to exchange the one or more signaling messages in response to the first UE initiating the browser-to-browser call over a WebSockets interface.

6. The method recited in claim 1, wherein the first UE specifies the one or more QoS requirements to configure the guaranteed QoS level for the browser-to-browser call in response to one or more of initiating the browser-to-browser call with the second UE or receiving a request to establish the browser-to-browser call with the second UE.

7. The method recited in claim 1, wherein the first UE specifies the one or more QoS requirements to configure the guaranteed QoS level for the browser-to-browser call in response to initialization with the web-based platform.

8. The method recited in claim 1, wherein the web-based platform comprises WebRTC.

9. The method recited in claim 1, wherein the wireless network comprises one or more of a cellular network or a Wi-Fi network.

10. An apparatus for implementing quality of service (QoS) for a web-based platform, comprising:
means for exchanging, in a call establishment phase, one or more signaling messages between a server and a first user equipment (UE) over a wireless network to establish a browser-to-browser call between the first UE and a second UE;
means for specifying, by the first UE via a QoS application program interface in the web-based platform, one or more QoS requirements for configuring and activating a guaranteed QoS level when originating the browser-to-browser call or receiving a request to establish the browser-to-browser call;
means for configuring the guaranteed QoS level for the browser-to-browser call between the first UE and the second UE during the call establishment phase based on the one or more QoS requirements specified via the QoS application program interface in the web-based platform;
means for establishing a peer-to-peer connection with the server as a remote peer endpoint, wherein the peer-to-peer connection with the server provides a media path for the browser-to-browser call between the first UE and the second UE; and
means for activating the configured guaranteed QoS level for the browser-to-browser call in response to establishing the peer-to-peer connection with the server according to the one or more QoS requirements associated with the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

11. The apparatus recited in claim 10, further comprising:
means for activating the guaranteed QoS level for a signaling IP port used to exchange the one or more signaling messages in response to the first UE initiating the browser-to-browser call over a WebSockets interface.

12. The apparatus recited in claim 10, wherein the web-based platform comprises WebRTC.

13. An apparatus for implementing quality of service (QoS) for a web-based platform, comprising:
a transceiver configured to exchange, in a call establishment phase, one or more signaling messages between a server and a first user equipment (UE) over a wireless network to establish a browser-to-browser call between the first UE and a second UE; and
one or more processors adapted to:
execute the web-based platform, wherein the executed web-based platform comprises a QoS application program interface configured to specify, at the first UE, one or more QoS requirements to configure and to activate a guaranteed QoS level for the browser-to-browser call between the first UE and the second UE during the call establishment phase when originating the browser-to-browser call or receiving a request to establish the browser-to-browser call based on the one or more QoS requirements specified via the QoS application program interface in the executed web-based platform;
establish a peer-to-peer connection with the server as a remote peer endpoint, wherein the peer-to-peer connection with the server provides a media path for the browser-to-browser call between the first UE and the second UE; and
activate the configured guaranteed QoS level for the browser-to-browser call in response to establishing the peer-to-peer connection with the server according to the one or more QoS requirements associated with the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

14. The apparatus recited in claim 13, wherein the one or more processors are further adapted to activate the guaranteed QoS level for a signaling IP port used to exchange the one or more signaling messages in response to the first UE initiating the browser-to-browser call over a WebSockets interface.

15. The apparatus recited in claim 13, wherein the web-based platform comprises WebRTC.

16. A non-transitory computer-readable storage medium having computer-executable instructions for implementing quality of service (QoS) for a web-based platform recorded thereon, wherein executing the computer-executable instructions on one or more processors causes the one or more processors to:
exchange, in a call establishment phase, one or more signaling messages between a server and a first user equipment (UE) over a wireless network to establish a browser-to-browser call between the first UE and a second UE;
specify, by the first UE via a QoS application program interface in the web-based platform, one or more QoS requirements for configuring and activating a guaranteed QoS level when originating the browser-to-browser call or receiving a request to establish the browser-to-browser call;

configure the guaranteed QoS level for the browser-to-browser call between the first UE and the second UE during the call establishment phase based on the one or more QoS requirements specified via the QoS application program interface in the web-based platform;

establish, by the first UE, a peer-to-peer connection with the server as a remote peer endpoint, wherein the peer-to-peer connection with the server provides a media path for the browser-to-browser call between the first UE and the second UE; and activate, by the first UE, the configured guaranteed QoS level for the browser-to-browser call in response to establishing the peer-to-peer connection with the server according to the one or more QoS requirements associated with the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

17. The non-transitory computer-readable storage medium recited in claim 16, wherein executing the computer-executable instructions on the one or more processors further causes the one or more processors to activate the guaranteed QoS level for a signaling IP port used to exchange the one or more signaling messages in response to the first UE initiating the browser-to-browser call over a WebSockets interface.

18. The non-transitory computer-readable storage medium recited in claim 16, wherein the web-based platform comprises WebRTC.

19. A method for implementing quality of service (QoS) for a web-based platform, comprising:
exchanging, over a wireless network in a call establishment phase, one or more signaling messages between a server and a first user equipment (UE) to establish a browser-to-browser call between the first UE and a second UE;
determining, at the first UE, one or more parameters associated with an Internet Protocol (IP) flow that the wireless network allocated to support the browser-to-browser call based on the one or more signaling messages exchanged during the call establishment phase;
communicating, by the web-based platform, to resident software on the first UE to indicate data activity on the IP flow that the wireless network allocated to support the browser-to-browser call and to indicate one or more QoS requirements for the IP flow allocated to support the browser-to-browser call;
configuring, by the resident software on the first UE, a guaranteed QoS level for the browser-to-browser call between the first UE and the second UE in response to the web-based platform indicating the data activity on the IP flow allocated to support the browser-to-browser call and the one or more QoS requirements for the IP flow allocated to support the browser-to-browser call;
establishing, by the first UE, a peer-to-peer connection with the server as a remote peer endpoint, wherein the peer-to-peer connection with the server provides a media path for the browser-to-browser call between the first UE and the second UE; and
activating, by the first UE, the configured guaranteed QoS level for the browser-to-browser call in response to establishing the peer-to-peer connection with the server according to the one or more QoS requirements associated with the IP flow allocated to support the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

20. The method recited in claim 19, wherein the server further communicates with an infrastructure in the wireless network to guarantee the QoS level during the browser-to-browser call regardless of loading in the wireless network.

21. The method recited in claim 19, wherein the server provides at least a QoS class identifier (QCI), an IP address, and a port associated with the peer connection established with the first UE to configure the guaranteed QoS level.

22. The method recited in claim 19, wherein the server routes the data associated with the browser-to-browser call using one or more of Real-Time Transport Protocol (RTP) or Secure RTP (S-RTP).

23. The method recited in claim 19, further comprising:
activating the guaranteed QoS level for a signaling IP port used to exchange the one or more signaling messages in response to the first UE initiating the browser-to-browser call over a WebSockets interface.

24. The method recited in claim 19, wherein the first UE specifies the one or more QoS requirements to configure the guaranteed QoS level for the browser-to-browser call in response to one or more of initiating the browser-to-browser call with the second UE or receiving a request to establish the browser-to-browser call with the second UE.

25. The method recited in claim 19, wherein the first UE specifies the one or more QoS requirements to configure the guaranteed QoS level for the browser-to-browser call in response to initialization with the web-based platform.

26. The method recited in claim 19, wherein the web-based platform comprises WebRTC.

27. The method recited in claim 19, wherein the wireless network comprises one or more of a cellular network or a Wi-Fi network.

28. The method recited in claim 19, wherein the web-based platform marks one or more IP data packets associated with the browser-to-browser call using a DiffServ Code Point (DSCP) marking for QoS-enabled traffic to indicate the data activity on the IP flow allocated to support the browser-to-browser call such that the resident software is configured to activate the configured guaranteed QoS level in response to sensing the one or more IP data packets that have the DSCP marking on the IP flow allocated to support the browser-to-browser call.

29. An apparatus for implementing quality of service (QoS) for a web-based platform, comprising:
means for exchanging, over a wireless network in a call establishment phase, one or more signaling messages between a server and a first user equipment (UE) to establish a browser-to-browser call between the first UE and a second UE;
means for determining, at the first UE, one or more parameters associated with an Internet Protocol (IP) flow that the wireless network allocated to support the browser-to-browser call based on the one or more signaling messages exchanged during the call establishment phase;
means for communicating, by the web-based platform, to resident software on the first UE to indicate data activity on the IP flow that the wireless network allocated to support the browser-to-browser call and to indicate one or more QoS requirements for the IP flow allocated to support the browser-to-browser call;

means for configuring, by the resident software on the first UE, a guaranteed QoS level for the browser-to-browser call between the first UE and the second UE in response to the web-based platform indicating the data activity on the IP flow allocated to support the browser-to-browser call and the one or more QoS requirements for the IP flow allocated to support the browser-to-browser call;

means for establishing a peer-to-peer connection with the server as a remote peer endpoint, wherein the peer-to-peer connection with the server provides a media path for the browser-to-browser call between the first UE and the second UE; and means for activating the configured guaranteed QoS level for the browser-to-browser call in response to establishing the peer-to-peer connection with the server according to the one or more QoS requirements associated with the IP flow allocated to support the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

30. The apparatus recited in claim 29, further comprising:
means for activating the guaranteed QoS level for a signaling IP port used to exchange the one or more signaling messages in response to the first UE initiating the browser-to-browser call over a WebSockets interface.

31. The apparatus recited in claim 29, wherein the web-based platform comprises WebRTC.

32. An apparatus for implementing quality of service (QoS) for a web-based platform, comprising:
a transceiver configured to exchange, over a wireless network in a call establishment phase, one or more signaling messages between a server and a first user equipment (UE) to establish a browser-to-browser call between the first UE and a second UE; and
one or more processors adapted to:
determine one or more parameters associated with an Internet Protocol (IP) flow that the wireless network allocated to support the browser-to-browser call based on the one or more signaling messages exchanged during the call establishment phase;
execute resident software and the web-based platform on the first UE, wherein the executed resident software is configured to receive, from the executed web-based platform, an indication of data activity on the IP flow that the wireless network allocated to support the browser-to-browser call and to indicate one or more QoS requirements for the IP flow allocated to support the browser-to-browser call and to configure a guaranteed QoS level for the browser-to-browser call between the first UE and the second UE in response to the indication of the data activity on the IP flow allocated to support the browser-to-browser call and the one or more QoS requirements for the IP flow allocated to support the browser-to-browser call;
establish a peer-to-peer connection with the server as a remote peer endpoint, wherein the peer-to-peer connection with the server provides a media path for the browser-to-browser call between the first UE and the second UE; and
activate the configured guaranteed QoS level for the browser-to-browser call in response to establishing the peer-to-peer connection with the server according to the one or more QoS requirements associated with the IP flow allocated to support the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

33. The apparatus recited in claim 32, wherein the one or more processors are further adapted to activate the guaranteed QoS level for a signaling IP port used to exchange the one or more signaling messages in response to the first UE initiating the browser-to-browser call over a WebSockets interface.

34. The apparatus recited in claim 32, wherein the web-based platform comprises WebRTC.

35. A non-transitory computer-readable storage medium having computer-executable instructions for implementing quality of service (QoS) for a web-based platform recorded thereon, wherein executing the computer-executable instructions on one or more processors causes the one or more processors to:
exchange, over a wireless network in a call establishment phase, one or more signaling messages between a server and a first user equipment (UE) to establish a browser-to-browser call between the first UE and a second UE;
determine one or more parameters associated with an Internet Protocol (IP) flow that the wireless network allocated to support the browser-to-browser call based on the one or more signaling messages exchanged during the call establishment phase;
communicate, by the web-based platform, to resident software on the first UE to indicate data activity on the IP flow that the wireless network allocated to support the browser-to-browser call and to indicate one or more QoS requirements for the IP flow allocated to support the browser-to-browser call;
configure, by the resident software on the first UE, a guaranteed QoS level for the browser-to-browser call between the first UE and the second UE in response to the web-based platform indicating the data activity on the IP flow allocated to support the browser-to-browser call and the one or more QoS requirements for the IP flow allocated to support the browser-to-browser call;
establish, by the first UE, a peer-to-peer connection with the server as a remote peer endpoint, wherein the peer-to-peer connection with the server provides a media path for the browser-to-browser call between the first UE and the second UE; and
activate the configured guaranteed QoS level for the browser-to-browser call in response to establishing the peer-to-peer connection with the server according to the one or more QoS requirements associated with the IP flow allocated to support the browser-to-browser call, wherein the server is configured to route media data associated with the browser-to-browser call between the first UE and the second UE over at least the peer-to-peer connection established with the first UE according to the guaranteed QoS level to ensure that the corresponding media path receives preferential treatment in the wireless network.

36. The non-transitory computer-readable storage medium recited in claim 35, wherein executing the computer-executable instructions on the one or more processors further causes the one or more processors to activate the guaranteed QoS level for a signaling IP port used to exchange the one or more signaling messages in response to the first UE initiating the browser-to-browser call over a WebSockets interface.

37. The non-transitory computer-readable storage medium recited in claim 35, wherein the web-based platform comprises WebRTC.

* * * * *